US008351656B2

(12) United States Patent
Spicola et al.

(10) Patent No.: US 8,351,656 B2
(45) Date of Patent: Jan. 8, 2013

(54) REMOTE CONTACTLESS STEREOSCOPIC MASS ESTIMATION SYSTEM

(75) Inventors: Joseph A. Spicola, Tampa, FL (US); Erion Hasanbelliu, Gainesville, FL (US); Amir C. Rubin, Gainesville, FL (US); Eric Sinzinger, Lubbock, TX (US); Bradley Null, Austin, TX (US)

(73) Assignees: Spicola Tool, LLC, Tampa, FL (US); Texas Tech University, Lubbock, TX (US)

( * ) Notice: Subject to any disclaimer, the term of this patent is extended or adjusted under 35 U.S.C. 154(b) by 288 days.

(21) Appl. No.: 12/770,268

(22) Filed: Apr. 29, 2010
(Under 37 CFR 1.47)

(65) Prior Publication Data
US 2011/0196661 A1    Aug. 11, 2011

Related U.S. Application Data

(60) Provisional application No. 61/174,564, filed on May 1, 2009, provisional application No. 61/252,248, filed on Oct. 16, 2009.

(51) Int. Cl.
*G06K 9/00* (2006.01)
*G01C 3/08* (2006.01)
(52) U.S. Cl. ........................ 382/110; 382/203; 356/4.03
(58) Field of Classification Search .................. 382/100, 382/103, 106–107, 110, 123, 154, 155, 162, 382/168, 173, 181, 189, 193, 199, 203, 209, 382/219, 232, 254, 274, 276, 286–294, 305, 382/312, 321; 452/157; 705/7.25; 356/603, 356/4.03; 380/245
See application file for complete search history.

(56) References Cited

U.S. PATENT DOCUMENTS

| | | | |
|---|---|---|---|
| 4,963,035 A | 10/1990 | McCarthy et al. | |
| 5,474,085 A | 12/1995 | Hurnik et al. | |
| 5,483,441 A | 1/1996 | Scofield | |
| 5,576,949 A | 11/1996 | Scofield et al. | |
| 5,944,598 A | 8/1999 | Tong | |
| 6,377,353 B1 | 4/2002 | Ellis | |
| 6,549,289 B1 * | 4/2003 | Ellis | 356/603 |
| 6,678,396 B2 * | 1/2004 | Bartle | 382/110 |
| 6,974,373 B2 | 12/2005 | Kriesel | |
| 7,039,220 B2 | 5/2006 | Kriesel | |
| 7,128,024 B2 | 10/2006 | Doyle, II | |

(Continued)

OTHER PUBLICATIONS

Wang, Y., Abstract: Walk-through weighing of pigs using machine vision and an artificial neural network, Biosystems Engineering, May 2008, pp. 117-125, vol. 100, Issue 1, United States.

(Continued)

*Primary Examiner* — Seyed Azarian
(74) *Attorney, Agent, or Firm* — Proskauer Rose LLP

(57) ABSTRACT

A contactless system and method for estimating the volume, mass or weight of a target animal is provided. First, the target animal is imaged, preferably with a stereoscopic camera. A spatial representation of the target animal is derived from the stereoscopic images. Next, a virtual three-dimensional spatial model is provided, preferably having a shape resembling that of a characteristic of the animal to which the target animal belongs. A software module is provided to reshape the virtual spatial model, using a finite set of independently configurable shape variables, to approximately fit the spatial representation of the individual animal. Finally, the volume, mass or weight of the target animal is estimated as a function of shape variables characterizing the reshaped virtual model.

93 Claims, 32 Drawing Sheets

U.S. PATENT DOCUMENTS

| | | |
|---|---|---|
| 7,158,915 B2 | 1/2007 | Wargon |
| 7,310,431 B2 | 12/2007 | Gorturk et al. |
| 7,399,220 B2 * | 7/2008 | Kriesel et al. ............ 452/157 |
| 7,603,284 B2 * | 10/2009 | Stroman et al. ............ 705/7.25 |
| 7,853,046 B2 * | 12/2010 | Sharony ............ 382/110 |
| 2005/0084176 A1 | 4/2005 | Talapov |
| 2006/0002553 A1 * | 1/2006 | Krien ............ 380/245 |
| 2007/0025612 A1 | 2/2007 | Iwasaki |
| 2009/0203343 A1 | 8/2009 | Principe |

OTHER PUBLICATIONS

Brandl, Nabil et al.; Determination of Live Weight of Pigs From Dimensions Measured Using Image Analysis; Jan. 1, 1996; Computers and Electronics in Agriculture 15 (1996) 57-72; Elsevier, 1996.

* cited by examiner

Fig. 13a  $V = (V)(S)$

Fig. 13b  $(S) = \begin{bmatrix} Sx & 0 & 0 \\ 0 & Sy & 0 \\ 0 & 0 & Sz \end{bmatrix}$ Fig. 13c  $Sx = \dfrac{\Sigma a_x b_x w}{\Sigma b_x^2 w}$ $$w_i = w_p \times e^{-r(dx_i^2 + dy_i^2 + dz_i^2)}$$

$$\begin{bmatrix} dx & dy & dz \\ \cdot & \cdot & \cdot \\ \cdot & \cdot & \cdot \\ \cdot & \cdot & \cdot \\ \cdot & \cdot & \cdot \end{bmatrix}^T \times \begin{bmatrix} w_1 \\ \cdot \\ \cdot \\ \cdot \\ w_n \end{bmatrix} = \begin{bmatrix} t_x \\ t_y \\ t_z \end{bmatrix}$$

$$R_z = \begin{bmatrix} \dfrac{\Sigma(a \cdot b)w}{(N)(\Sigma(b \cdot b)2)} & \dfrac{-\Sigma(a \times b)w}{(N)(\Sigma(b \cdot b)w)} & 0 \\ \dfrac{\Sigma(a \times b)w}{(N)(\Sigma(b \cdot b)w)} & \dfrac{\Sigma(a \cdot b)w}{(N)(\Sigma(b \cdot b)w)} & 0 \\ 0 & 0 & 1 \end{bmatrix}$$

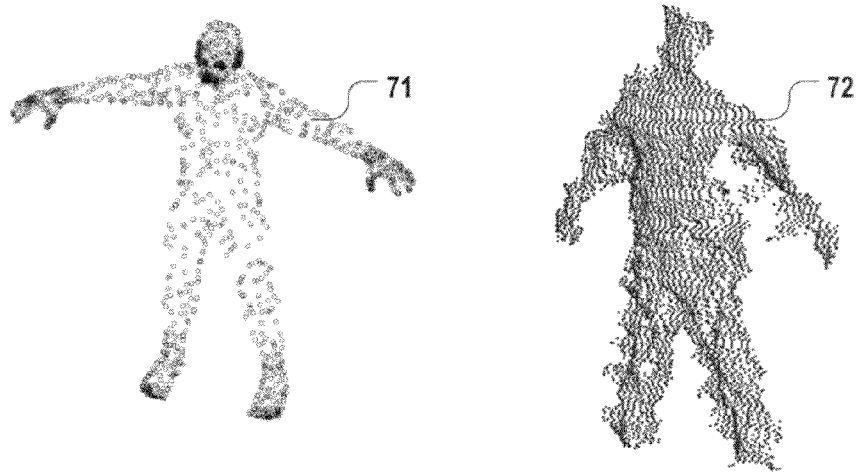
Fig. 27
Fig. 28
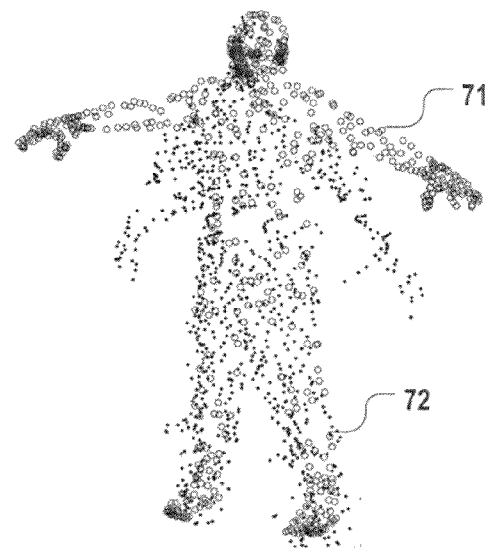
Fig. 29

REMOTE CONTACTLESS STEREOSCOPIC MASS ESTIMATION SYSTEM

RELATED APPLICATIONS

This application claims priority to, and incorporates by reference, U.S. provisional patent application No. 61/174,564, filed May 1, 2009, and U.S. provisional patent application No. 61/252,248, filed Oct. 16, 2009, both entitled "Remote Contactless Stereoscopic Mass Estimation System."

COPYRIGHT NOTICE

Portions of the disclosure of this patent document and the incorporated provisional applications contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

NAMES OF PARTIES TO A JOINT RESEARCH AGREEMENT

The invention claimed herein was made by or on behalf of Spicola Tool, LLC, and Texas Tech University who are parties to a joint research agreement.

FIELD OF THE INVENTION

This invention relates generally to imaging systems, and more specifically, to systems that use imaging techniques to estimate the mass or weight of an animal.

BACKGROUND OF THE INVENTION

Animal weight is a significant indicator of animal health, development, and likely yield. It is also useful to know the weight of animal before administering medicine, as dosage amounts are typically determined by the animal's estimated weight.

Cattle and other livestock are conventionally weighed by being placed on a scale. Typically, the animal is forced through a narrow passageway called a "cattle chute" onto a scale. Then, the animal is clamped from both sides with a squeeze scale. The process agitates the animal. Transportation of the animal to the scale also stresses the animal. During the time the animal is transported to and squeezed into the scale, the animal often loses weight. Sometimes, aggregate pen scales—some costing about $75,000—are used.

There is a need for a contactless mass or weight estimation system that avoids aggravating the animals. There is also a need for a relatively low-cost system that does not require an elaborate non-mobile wrap-around-the-animal setup of cameras and sensors and does not require wrap-around three-dimensional modeling.

U.S. Pat. No. 4,963,035 to McCarthy et al. discloses an image-processing-based fish sorting machine. The inventor suggests, on column 6, lines 25-29, that the machine could, as one of many possible functions, estimate the weight of a fish as a function of the area of the fish on an image. McCarthy et al. does not teach or suggest fitting a multi-dimensional virtual fish model having configurable shape parameters to the fish image, or of estimating the weight of the fish as a function of any adjusted-to-best-fit shape parameters of a virtual model.

U.S. Pat. No. 5,576,949 to Scofield et al. discloses a system to evaluate the "economic potential" of an animal, based on several sensed characteristics, including images of the animal and a weight scale. Although the system includes a conventional weight scale, Scofield et al. briefly remarks, at col. 33, lines 52-55, that the weight could alternatively be estimated from the height and width measurements obtained from captured images of the animal. Scofield et al. does not, however, teach or suggest fitting a multi-dimensional virtual animal model having configurable shape parameters to the animal image, or of estimating the weight of a live animal as a function of any adjusted-to-best-fit shape parameters of a virtual model.

U.S. Pat. No. 6,549,289 to Ellis teaches projecting a light pattern, such a light grid or pattern of light dots, onto a target animal, photographing the reflected pattern with two cameras, and using triangulation techniques to generate a three-dimensional surface representation of the target animal. Ellis suggests calculating the volume of portions of the target animal from the three-dimensional representation. Ellis does not, however, teach or suggest fitting a multi-dimensional virtual animal model having configurable shape parameters to the image-derived three-dimensional representation of the animal, or of estimating the weight of the target animal as a function of the adjusted-to-best-fit shape parameters of the virtual model.

U.S. Pat. No. 7,128,024 to Doyle, II criticizes animal weight as a poor indicator of animal growth in a cow. Doyle II discloses a system that uses image, ultrasound, and/or acoustic sensors to obtain approximate measurements of the skeletal size of a cow, which the author suggests will better correlate to the ultimate carcass weight of the cow.

U.S. Pat. No. 7,399,320 to Kriesel et al. describes various methods for volumetric and dimensional measurements of livestock. Kriesel discloses an elaborate setup of range cameras and sensors to scan and sense an animal and develop a true three-dimensional ("3D") representation of the animal. Then, from the three-dimensional data set, Kriesel's system computes the volume of the animal. In Kriesel's system, it is necessary to position the target animal or carcass in a proper position with respect to the cameras.

Also, Kriesel prefers to use a livestock scale 45 to weigh the cow. In column 80, Kriesel remarks that an inferred weight can alternatively be calculated from the true 3D representation of the animal, without the use of scales. But Kriesel adds that an inferred weight "is presently not in use and has not been taught by current patent art." Moreover, Kriesel does not suggest inferring the cow's total weight from a virtual spatial model of the cow that has been reshaped to fit 3D representation of the animal.

In column 35, Kriesel suggests using a cow model to estimate some of the hidden dimensions of a target cow, some of whose dimensions have been directly determined through image analysis of the cow's non-hidden dimensions. In column 65, Kriesel also suggests scaling an MRI model of a cow or hog to match the target animal in order to estimate the position and size of the targeted animals' internal organs, muscles, and bones, and thereby estimate production yields. But Kriesel does not disclose or suggest that one could, with a reasonable degree of accuracy, estimate the entire weight of a live target animal as a function of the adjusted-to-best-fit shape parameters of a virtual model.

SUMMARY OF THE INVENTION

A volume, mass, and weight estimation system is provided comprising an image-capturing apparatus, a user interface, a plurality of image processing modules, and a volume, mass, and weight estimation module.

In a preferred embodiment, the image-capturing apparatus comprises two cameras with lenses for producing a stereo image of an animal, an embedded computer, a power supply, a simple, single-point laser range finder, an automated lighting system, and cabling, sensors, and touchpads or other user interface devices.

A first image processing module generates a three-dimensional point cloud from a stereoscopic image of the targeted animal. A second image processing module crops the point cloud to substantially only include the targeted animal. A third image processing module aligns the cropped point cloud of the targeted animal with a canonical virtual model and reshapes the aligned canonical virtual model of the animal to approximately or optimally fit the cropped point cloud. This reshaping is accomplished through the independent adjustment of at least two independently configurable shape parameters of the virtual model to reshape the virtual model into an optimal fit with the representation of the individual animal. Finally, a volume, mass and/or weight estimation module estimates the mass or weight of the targeted animal as a function of the configurable shape parameters of the virtual model.

The preferred embodiment also provides a user interface. The user interface comprises buttons or a menu for selecting an animal type or class. The interface also includes either a simple text display or a digital screen such as an LCD screen. The output interface is used to relay both the predicted weight and an error parameter related to the accuracy of the fit between the reshaped virtual model and the cropped point cloud.

Advantageously, the invention allows animals—and in particular, livestock mammals—to be weighed without direct contact. The invention, however, is not limited to making mass or weight estimations of cattle, livestock animals, mammals, or any other particular type of living organism. Indeed, the present invention has been demonstrated to estimate the weight of humans and other animals within a reasonable degree of accuracy, even—surprisingly—when attempting to fit humans and other animals to the canonical cow model.

The present invention also covers various embodiments of an automated process of aligning the virtual model and cropped point cloud to have substantially the same orientations. In one embodiment, a processor is particularly programmed with an image-fitting algorithm that either over-weights the matching of, or matches only, selected or essential features (e.g., the torso but not the head) of the virtual model to the point cloud. Other embodiments are described in the incorporated provisional applications from which this application depends.

The present invention also provides a volume, mass and/or weight estimation module. The volume, mass and/or weight estimation module generates an estimated volume, mass and/or or weight based upon the adjusted shape parameters of the virtual model.

BRIEF DESCRIPTION OF THE DRAWINGS

FIG. 9 illustrates one embodiment of a function for weighting each of the points of the point cloud for purposes of translating, rotating, and scaling the cropped point cloud image to fit the virtual animal model.

FIG. 10 illustrates one embodiment of a function for translating the cropped point cloud into better alignment with the virtual animal model.

FIG. 11 illustrates one embodiment of a rotation matrix for rotating the cropped point cloud about the z axis into better alignment with the virtual animal model.

FIG. 12 illustrates one embodiment of a rotation function for orienting the cropped point cloud into better alignment with the virtual animal model.

FIGS. 13a-13c illustrates one embodiment of a scaling function for scaling the virtual animal model into better alignment with the cropped point cloud.

FIG. 27 illustrates a canonical three-dimensional virtual human animal model.

FIG. 28 is a perspective view of a cropped stereoscopic point cloud image of a person.

FIG. 29 illustrates the cropped stereoscopic point cloud image of a person from FIG. 28 fitted to the human animal model of FIG. 27 to estimate the weight of the person.

DETAILED DESCRIPTION

In describing preferred and alternate embodiments of the technology described herein, as illustrated in FIGS. 1-43, specific terminology is employed for the sake of clarity. The technology described herein, however, is not intended to be limited to the specific terminology so selected, and it is to be understood that each specific element includes all technical equivalents that operate in a similar manner to accomplish similar functions.

I. General Overview

Figure 1A:
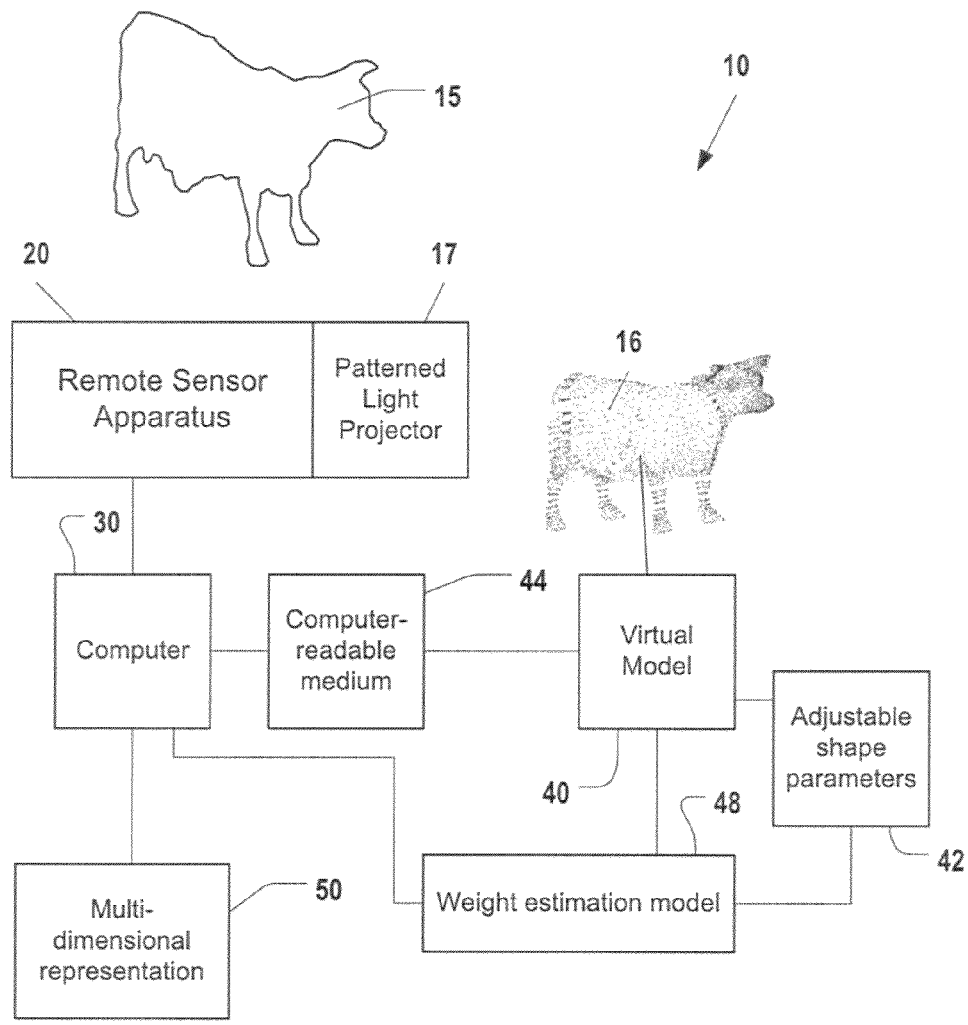
FIG. 1A illustrates one embodiment of a system for estimating the mass or weight of an individual "target" animal.

FIG. 1A illustrates one embodiment of a system 10 for estimating the mass or weight of an individual "target" animal 15. The system 10 comprises a remote sensing apparatus or machine 20, a computer 30, and a virtual animal model 40 that provides a canonical, multi-dimensional profile or shape of the class of animal to which the target animal 15 belongs.

The machine 20—which may comprise a conventional visible-spectrum camera, a stereo camera, a laser range finder, and/or an infrared or thermal imaging system—generates a representation 50 of a visible or spatial characteristic of the target animal 15. Preferably, the machine 20 is portable and includes a handle (not shown) to facilitate its handheld operation. The machine 20 may also include a stabilizer to generate a more accurate representation.

Figure 1B:
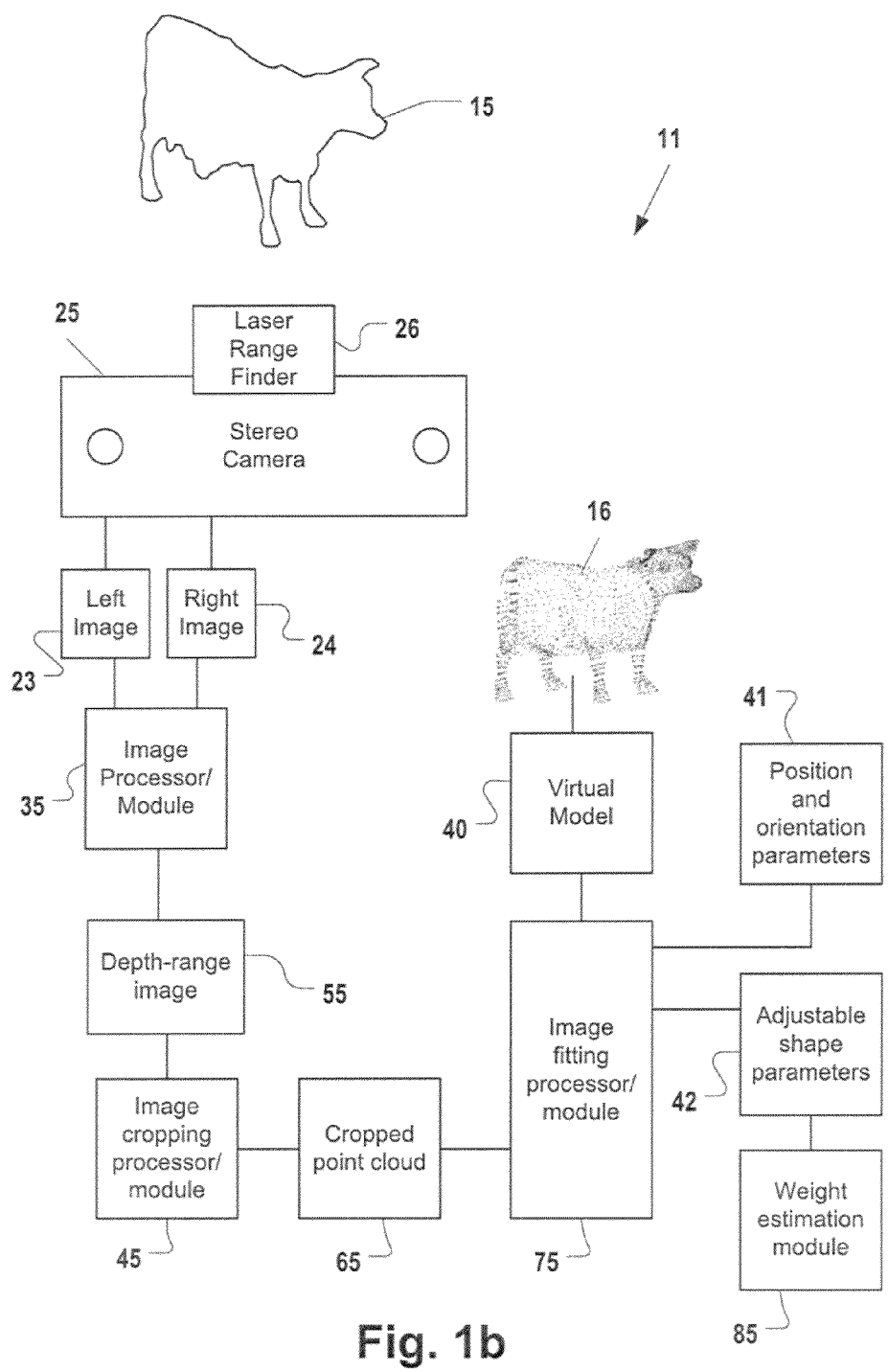
FIG. 1B illustrates another embodiment of a system for estimating the mass or weight of a target animal.

FIG. 1B presents a more particular embodiment of a system 11 for estimating the volume, mass and/or weight of an individual "target" animal 15. In FIG. 1B, the remote sensing apparatus comprises a stereo camera 25 such as the Bumble-Bee™ 2 or XB3 stereo vision camera systems developed by Point Grey Research, Inc., of Richmond, British Columbia, Canada. The remote sensing apparatus optionally also includes a single-point laser range finder 26 to identify the distance from the camera to a single point on the imaged cattle. Although the laser range finder 26 is not necessary, it improves the accuracy of stereoscopic image processing and image segmentation routines (discussed later). Further improvements may be achieved using a projector to project a light grid onto the individual animal. The stereo camera 25 comprises at least two structurally interconnected, spaced-apart imagers. The imagers are spaced no more than 2 feet apart, and preferably, less than 6 inches apart, to make the system 11 more portable and amenable to handheld operation. The camera 25 preferably includes a targeting reticule to help a user properly center an animal in the image and zoom the camera before taking a picture.

The stereo camera 25 simultaneously captures left and right images 23 and 24 of the target animal 15. Then, using commercially available software, an image processor 35—which is optionally structurally integrated with the camera 25 itself or a multi-purposed processor such as computer 30 particularly programmed with an image processing module—processes the two images to generate a stereoscopic depth-range image 55 (FIG. 4) of the target animal 15.

The depth-range image 55 consists of a projection of the target animal 15 on an image plane coupled with depth data. The depth data provides the estimated relative depth—from the perspective of the camera—of each point in the representation. The depth-range image 55 is a partial—rather than completely "true"—three-dimensional representation of the entire surface area of the target animal 15. If it were rotated 180 degrees about a vertical axis, the depth-range image 55 would depict a generally inverted view of the target animal 15.

The virtual animal model 40 provides at least a two-dimensional profile, and preferably a complete three-dimensional profile, of a reference animal 16. The reference animal 16 is also preferably of the same species—and even more preferably of the same breed—as the target animal 15. The virtual animal model 40 is stored on a computer readable medium 44 such as a hard drive, flash memory, random-access memory, or processor memory.

The computer 30 is particularly programmed with several automated image processing modules or capabilities. One module automatically crops the scenery in the depth-range image 55 to a cropped point cloud 65 (FIG. 1b) that comprises substantially only points representing the animal 15. Another module transforms either the virtual animal model 40, or the cropped point cloud 65, or both, into optimal fitting relationship with each other. Yet another module estimates the mass or weight of the individual animal 15 as a function of a plurality of transformation parameters that relate pre- and post-transformed versions of the virtual animal model 40 and/or cropped representation 65.

To facilitate rapid image processing, the computer 30 preferably comprises multiple 64-bit or higher processors located on one or more processor cores, including at least one processor optimized for image processing. The computer 30 is at least communicatively coupled to, and optionally also structurally joined with, the machine 20.

The system 11 also provides an image-fitting processor 75, which may be distinct from or one and the same as image processor 35 or image cropping processor 45 or a more multi-purposed processor (such as computer 30) particularly programmed with an image-fitting module. In a primitive embodiment, the image-fitting processor 75 provides a user with tools or input commands that enable the user to direct the translation, rotation, and reshaping of the virtual animal model 40. But in a significantly more advanced and preferred embodiment, the image-fitting processor 75 performs these steps automatically.

Both the cropped point cloud 65 and the virtual animal model 40 are represented in formats that allow them to be translated and at least partially rotated along any of its dimensions. More particularly, both the cropped point cloud 65 and the virtual animal model 40 are preferably represented as sets of spatially-determined (e.g., three-dimensional) points, with each point having spatial (e.g., X, Y, and Z) coordinates.

Through a series of transformations, either the cropped point cloud 65, or the virtual animal model 40, or both, are translated, rotated, and stretched into substantially the same orientation and into substantial alignment with each other. Also, a set of at least three independently scalable shape transformation parameters 42 are provided to linearly and independently scale the X, Y, and Z coordinates of each of the points of either the cropped point cloud 65 or the virtual animal model 40. As discussed further below, other, more sophisticated sets of shape parameters 42, including nonlinear shape parameters, may be provided to reshape the virtual animal model 40. By selecting appropriate values for these independently scalable shape transformation parameters 42, the computer 30 reshapes either the cropped point cloud 65 to approximately fit the virtual animal model 40, or the virtual animal model 40 to approximately fit the cropped point cloud 65.

The computer 30 is particularly programmed to estimate the volume, mass and/or weight of the target animal 15 as a function 48 of the configurable shape transformation parameters 42, or—as discussed further below—as a function of a suitably equivalent set of parameters. For example, the function 48 may take the form of the polynomial below:

$$W = ax + by + cz + d,$$

where W is the estimated volume, mass or weight, x, y, and z are three configurable shape transformation parameters 42, and a, b, c, and d are empirically-determined coefficients. Different functions, each with different empirically-determined coefficients, may be provided for different genders, types, breeds, and weight classes of an animal.

In the preferred embodiment, the computer 30 is also particularly programmed with the capability of automatically identifying suitable coefficients for variables of the volume, mass, or weight estimating function 48, wherein the variables of the volume, mass, or weight estimating function 48 are the same as or derived from the configurable shape parameters 42 or their equivalent.

II. Automated Cropping

Figure 17:
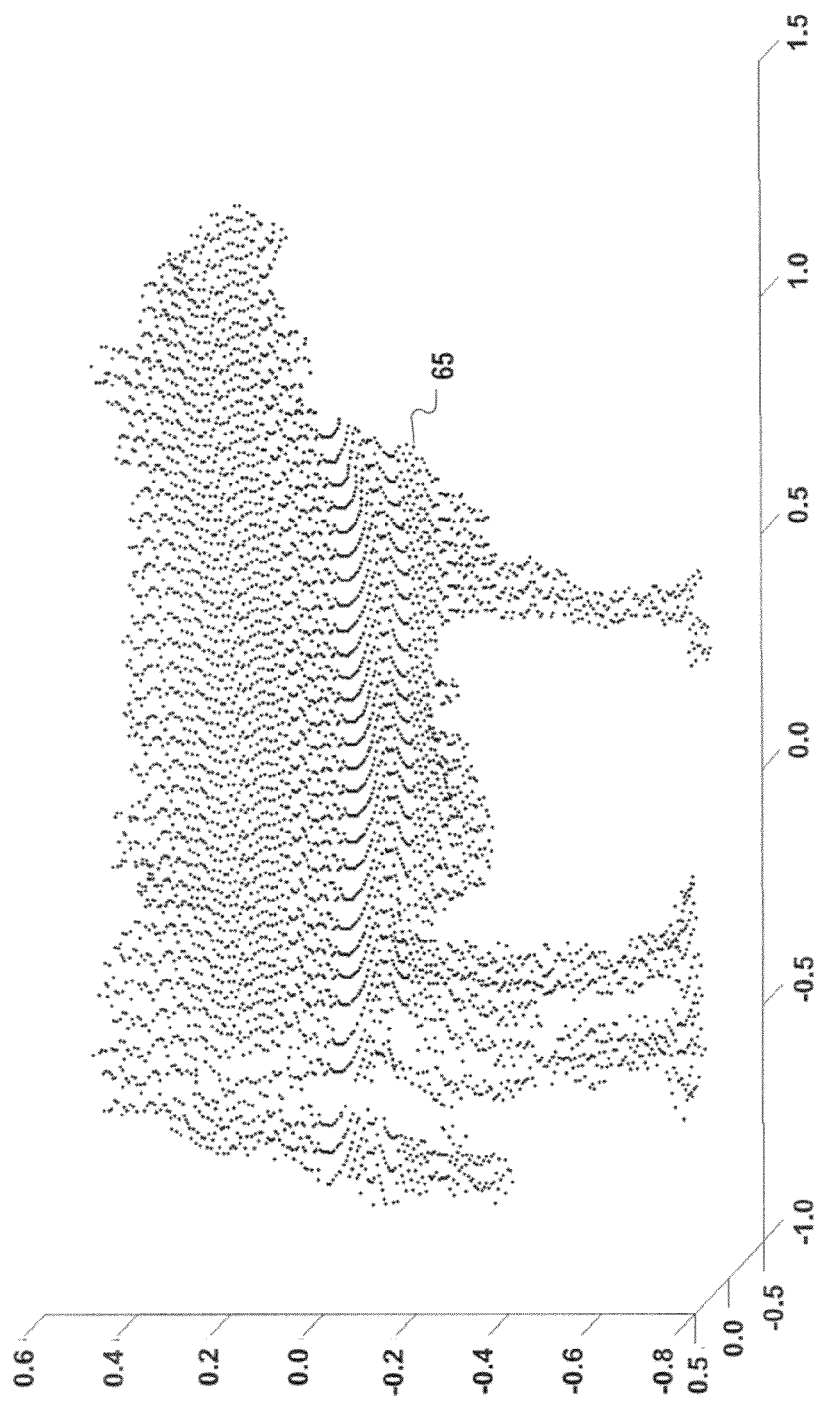
FIG. 17 illustrates the image of FIG. 16, after the completion of the image cropping process.

It is advantageous to crop out substantially all of the representation 50 or depth-range image 55, leaving substantially only a representation of the target animal 15 itself, in the form of a cropped point cloud 65 (as illustrated in FIG. 17). Accordingly, FIG. 1b depicts an image cropping processor 45, which may be distinct from or one and the same as the image processor 35 or a more multi-purposed processor (such as computer 30) particularly programmed with an image cropping module, to crop or segment the representation 55. The image cropping processor 45 produces a cropped, stereoscopic, camera-facing, partial surface profile, in the form of a point cloud 65, of the target animal 15.

In one embodiment, the image cropping processor 45 provides a user with tools to crop the scenery in the representation 50 or image 55 that includes the represented animal. In a more preferred embodiment, the image cropping processor 45 is particularly programmed to automatically distinguish the target animal 15 from the surrounding scene to create a cropped point cloud 65 that corresponds substantially only to the individual animal 15.

Because the goal is to spatially rescale and fit the virtual animal model 40 to the cropped point cloud 65, there is no need to retain color specific information in the cropped point cloud 65. Accordingly, the cropped point cloud 65 preferably provides a non-color-specific stereoscopic profile of the camera-facing portion of the animal.

The present invention covers several different embodiments of automated processes of cropping or "segmenting" the representation 50 or image 55. For example, segmenting can be done using color, shape, and/or edge detection algorithms. A laser range finder 26 would improve the reliability of an automated segmentation process, because the distance from the animal to the camera could be used to differentiate the animal profile from the surrounding scenery.

Figure 2:
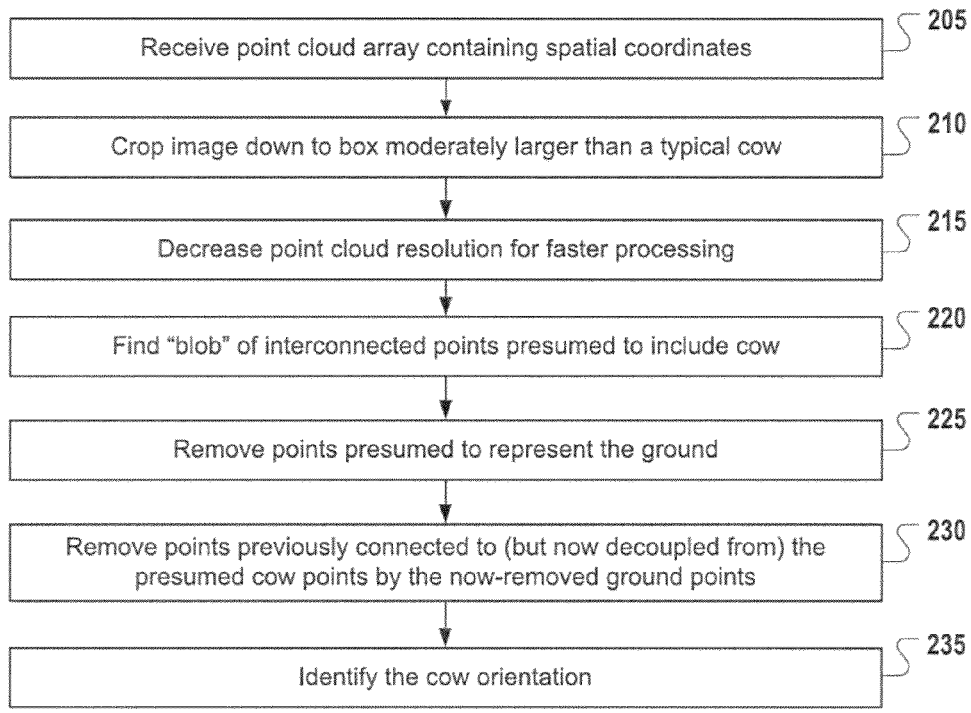
FIG. 2 is a functional flow diagram of one embodiment of an automated module and method for cropping a point cloud image to include substantially only points representing the target animal.

FIG. 2 illustrates a functional flow diagram of one embodiment of an automated image cropping module 200 for the cattle industry. Image cropping module 200 is implemented as a set of computer processing instructions stored in a computer readable medium and executed by a computer processor. The image cropping module 200 receives a depth-range image 55 in which each point is represented, at least, by three spatial x, y, and z coordinates. Preferably, the quantities stored by each point coordinate in the depth-range image 55 represent a fixed unit of length, such as meters. Each point in the depth-range image 55 may also have color and/or intensity values, but these values are not necessary for the embodiment of an image cropping algorithm set forth in FIG. 2.

In step 205, the image cropping module 200 generates or receives a point cloud image array containing the x, y and z spatial coordinates of each point in the depth-range image 55. It is assumed that the depth-range image 55 represents a cow or other animal standing in a field, lot, or pen, and that the cow is centered in the depth-range image 55.

Separating the cow (or other animal) from the environment is a non-trivial, tricky, and challenging aspect of the invention. Image processing speed issues further complicate the task. The image cropping embodiment 200 utilizes a series of processing steps designed to quickly and efficiently produce a cropped image that is suitable for fitting to a virtual animal model.

In step 210, the image cropping embodiment 200 reduces processing time by cropping the depth-range image 55 down to include only those points that are within threshold x, y, and z distances of the center point of the image 55. More particularly, the image cropping embodiment 200, when optimized for cattle applications, assumes that a cow in the image will never be longer than 3 meters, taller than 2.5 meters, or fatter than 2 meters. Accordingly, in step 210, all points more than 1.5 meters to the left or right of the center point of the point cloud image array are cropped out. All points more than 1 meter in front or behind the center point of the point cloud image array are also cropped out. All points more than 1 meter above, or 1.5 meters below, the center point of the point cloud image array are also cropped out. Of course, tighter or looser thresholds could also be employed, and entirely different thresholds may be more advantageous for other types of animals.

In step 215, the image cropping embodiment 200 further reduces processing time by decreasing the resolution of the point cloud. The challenge is to reduce the point cloud enough to facilitate fast processing while still retaining enough resolution to perform a suitable and relatively accurate virtual model fit. Experimentation suggests that reducing the point cloud to between 4000 and 8000 points results in a fairly good balance between these goals. One particularly fast implementation of step 215 is to retain every $n^{th}$ data point in the point cloud, where n is an integer equal to the rounded quotient of the number of points in the original point cloud divided by the number of desired points.

In step 220, the image cropping embodiment 200 further processes the cropped point cloud to identify a "blob"—that is, a spatially interconnected set of points—presumed to include the animal.

Figure 4:
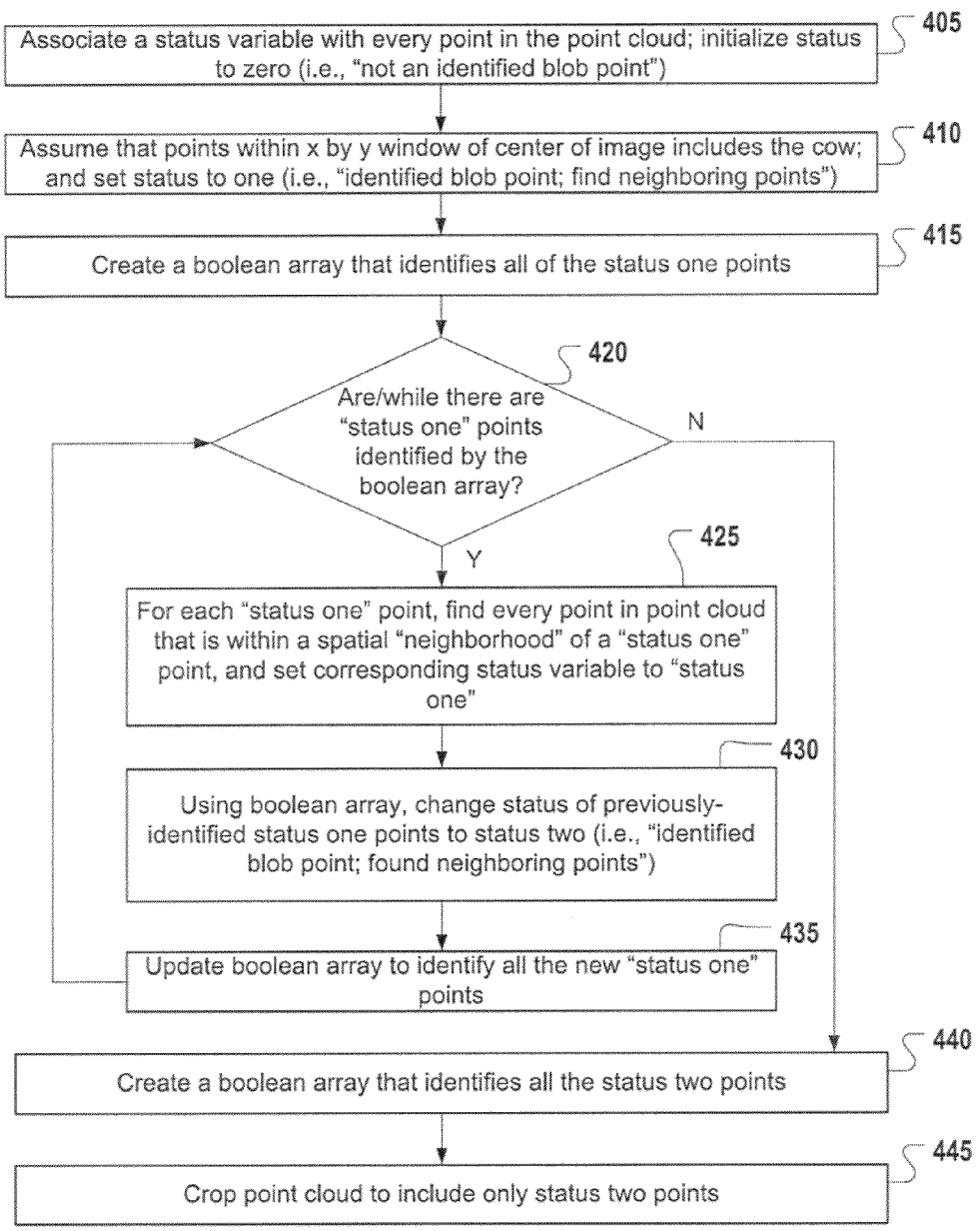
FIG. 4 is a functional flow diagram of one embodiment of an automated module and method for finding a "blob" of interconnected points in the point cloud image.

FIG. 4 illustrates the functional steps of one embodiment of a blob-finding method 400. In step 405, a status variable is associated with each point in the cropped point cloud. All of the status variables are initialized to zero, which means that the associated point cloud point has not been identified as a "blob" point.

In step 410, all points within an x by y window at the center of the image are assumed to represent a portion of the cow (or other animal), and the status variables for those points are set to one, which means that the point is an identified "blob" point, but needs to be processed to find neighboring points. For more efficient processing, in step 415 a Boolean array is generated that identifies all of the status "one" points.

The blob-finding method 400 proceeds into a do-while loop 420 that continues as long as there are any status "one" points in the Boolean array. In the first step 425 of the do-while loop 420, the method 400 finds every point in the point cloud that is within a spatial "neighborhood" of a status "one" point, and sets the corresponding status variable of every neighboring point to one. Experimentation suggests that defining the "neighborhood" of each status one point as a 10 cm by 10 cm by 10 cm box centered around the status one point is suitable for cattle imaging applications. Any other points in the point cloud within that neighborhood are presumed to be "connected" to the status one point, and a part of the "blob" that includes the animal.

In step 430 of the do-while loop 420, the method 400 changes the status of every status one point identified as such by the Boolean array to status "two," meaning that the associated point cloud point is a blob point for which immediately neighboring blob points have been identified. In step 435 of the do-while loop 420, the method 400 updates the Boolean array to identify all of the new status one points, if any.

After exiting the do-while loop 420, the method 400 proceeds to step 440, at which point another Boolean array is created that identifies all of the status two points. Then, in step 450, the point cloud is cropped to include only status "two" points. This concludes the blob-finding subroutine.

At this point, the point cloud has been cropped down to include only those points identified as part of an interconnected blob. But because the animal was imaged while standing on top of the ground, the interconnected blob is likely to include points representing the ground, because in a spatial sense, the ground is connected to the animal.

Figure 5:
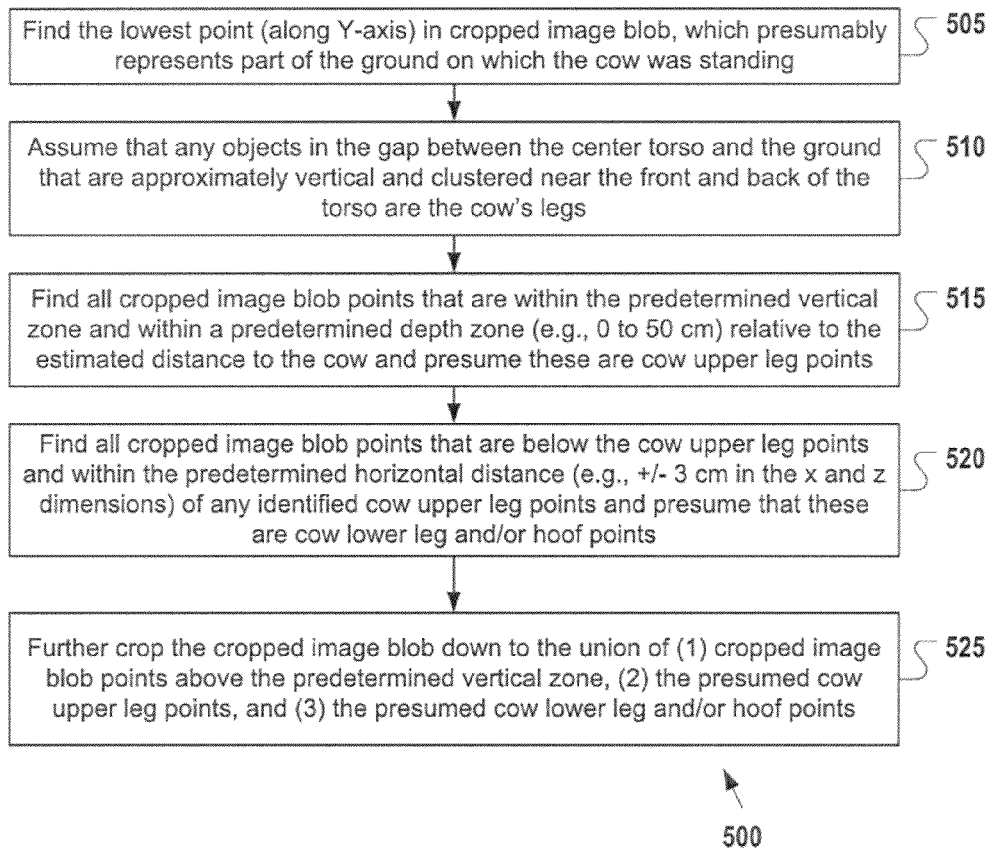
FIG. 5 is a functional flow diagram of one embodiment of an automated module and method for cropping out ground imagery from the point cloud image.

So when execution resumes at step 225 (FIG. 2), points presumed to represent the ground are removed from the cropped point cloud. FIG. 5 illustrates the functional steps of one embodiment of a ground-removing method 500, which distinguishes the points representing the body of the animal from points representing the ground by identifying points representing the legs of the animal.

In step 505, the ground-removing method 500 identifies the lowest point, along the Y-axis, in the cropped point cloud, and presumes that this point represents part of the ground on which the animal was standing. In step 510, the method 500 finds any objects in the gap between the center torso and the ground. If the objects are approximately vertical and clustered near the front and back of the torso, then the method 500 assumes that these are the cow's legs. Alternatively, the method 500 presumes that some portion of the animal's legs are in a vertical zone above the lowest point. Experimentation suggests that setting the vertical zone to include all points between 30 and 40 centimeters above the lowest point in the cropped point cloud is suitable for cattle applications. In step 515, the method 500 finds all cropped image blob points that are both within the vertical zone and within a depth zone (e.g., 0 to 50 cm. relative to the estimated distance to the animal), and presumes that these points represent portions of the upper legs of the animal. (The distance to the animal is either provided with the depth-range image 55 or is estimated by averaging the z-coordinates of a small x by y window at the center of the depth-range image 55).

In step 520, the method 500 finds all cropped image points that are below the upper leg points identified in step 515 and within a predetermined horizontal distance (e.g., ±3 cm in the x and z dimensions) of any identified upper leg points. The points identified in step 520 are presumed to represent lower leg and/or hoof portions of the animal.

In step 525, the method 500 crops the image point cloud down to the union of the cropped image blob points above the predetermined vertical zone (which is presumed to include the body of the animal) and the points identified in steps 515 and 520. The remaining points—most of which will typically be representative of the ground plane—are removed from the point cloud.

Execution then resumes at step 230. Although method 500 removes most of the ground points, the point cloud may still include spurious background objects, such as fences, posts, and chutes that were spatially interconnected to the blob by the ground plane. Now that the ground plane is removed, the image cropping module 200, in step 230, reprocesses the cropped point cloud to identify a "blob"—that is, a spatially interconnected set of points—presumed to include the animal. Step 230 executes the same method previously executed in step 220. This second pass removes points that are now decoupled from the presumed animal blob points by removal of the ground plane.

Figure 6:
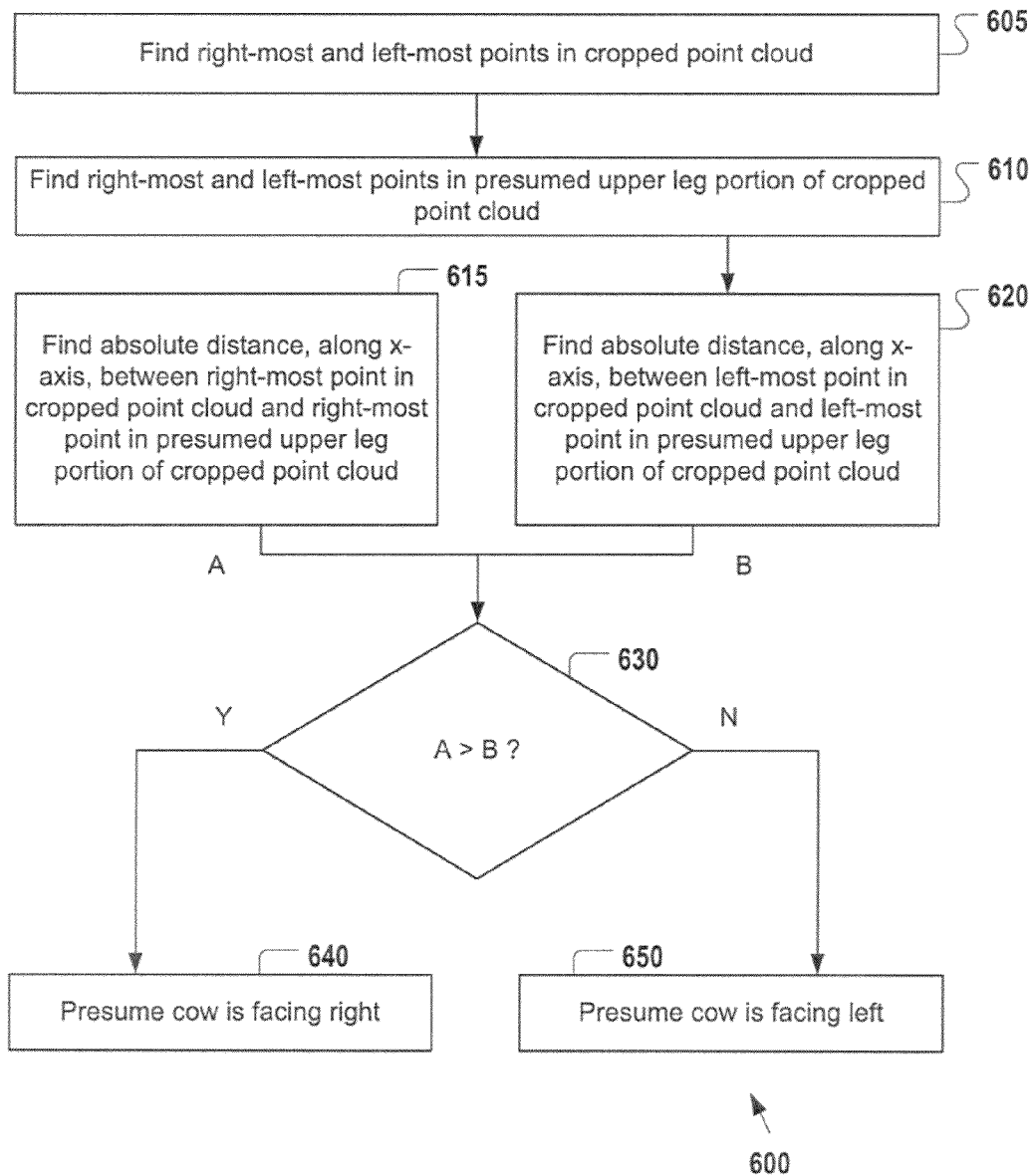
FIG. 6 is a functional flow diagram of one embodiment of an automated module and method for identifying the standing orientation of an animal in the point cloud image.

In step 235, the image cropping module 200 identifies the orientation (i.e., facing left or facing right) of the animal. FIG. 6 illustrates the functional steps of one embodiment of an orientation-detecting method 600. In step 605, the method 600 identifies the left-most and right-most points in the cropped point cloud. In step 610, the method 600 identifies the left-most and right-most points in the presumed upper leg portion of the cropped point cloud. In step 615, the method finds the absolute distance, along the x-axis between the right-most point in the cropped point cloud and the right-most point in the presumed upper leg portion of the cropped point cloud. In step 620, the method finds the absolute distance, along the x-axis between the left-most point in the cropped point cloud and the left-most point in the presumed upper leg portion of the cropped point cloud. If the value determined in step 615 exceeds the value determined in step 620, it is presumed, as shown in box 640, that the cow is facing right. Otherwise, it is presumed, as shown in box 650, that the cow is facing left.

III. Point Cloud Registration

Figure 3:
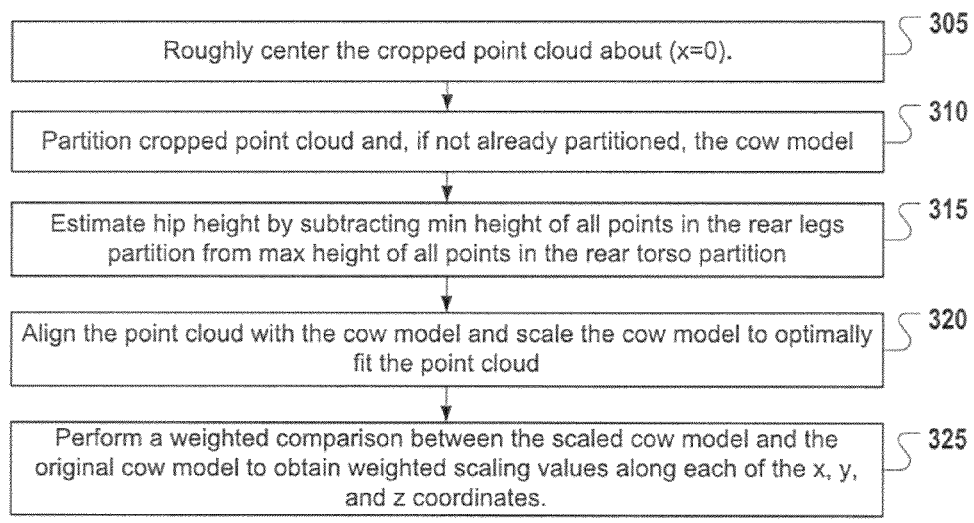
FIG. 3 is a functional flow diagram of one embodiment of an automated module and method for fitting a virtual animal model to the cropped point cloud image.

After generating the cropped point cloud 65, processing proceeds to the image fitting module 75. FIG. 3 is a functional flow diagram of one embodiment of an automated module 300 that pre-processes the cropped point cloud 65 to prepare it for registration to the virtual animal model 40, registers the cropped point cloud 65, and then post-processes the scaled virtual animal model 40 to obtain values used to estimate the weight of the animal. In step 305, the cropped point cloud 65 is roughly centered about the y-z plane intersecting the origin. In one embodiment, the cropped point cloud 65 is centered by shifting the cropped point cloud 65 by the negative of the median value of the x-coordinates of all of the points in the cropped point cloud 65.

Figure 8:
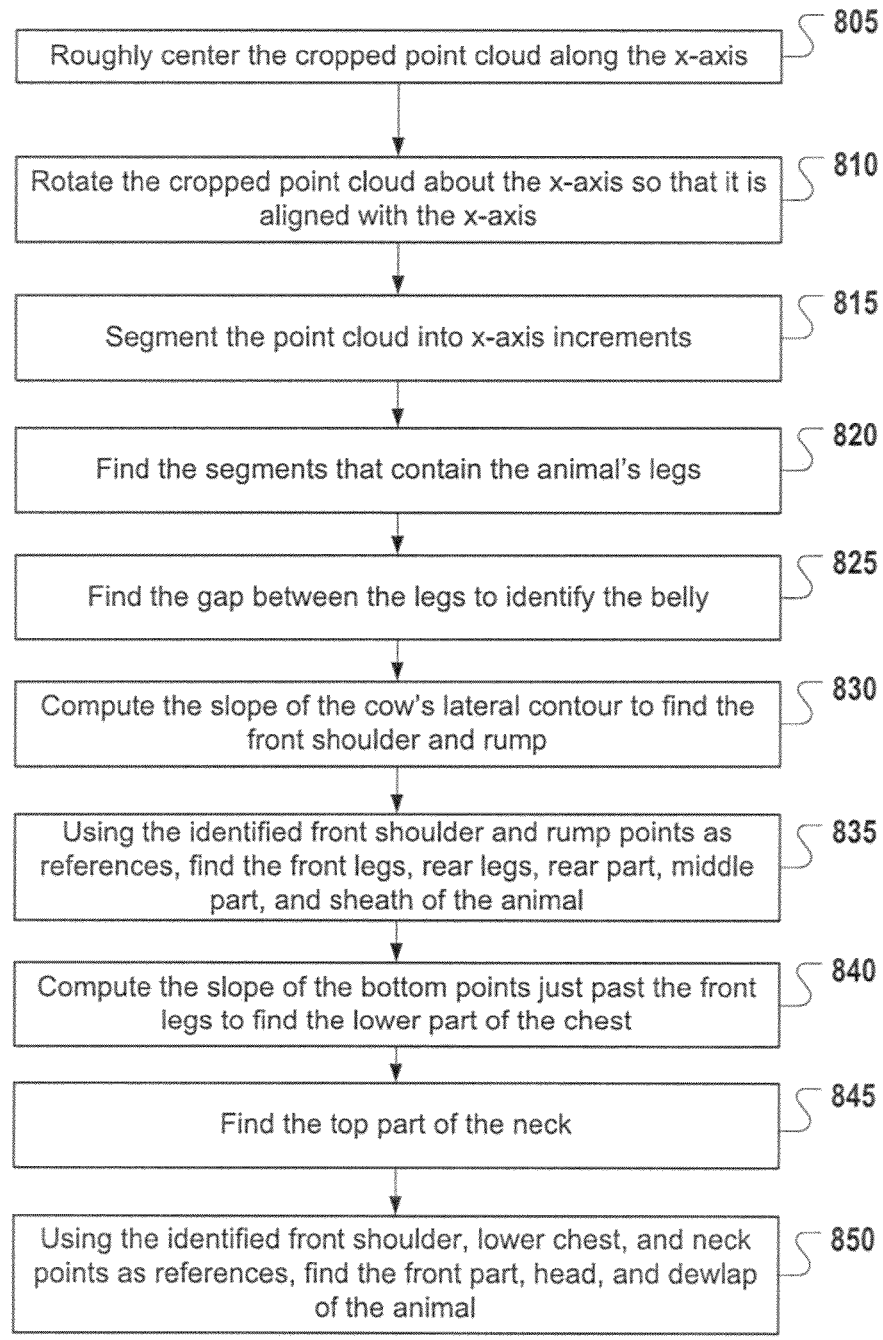
FIG. 8 is a functional flow diagram of one embodiment of an automated module and method for partitioning a livestock animal.

The point cloud registration process is computationally intensive. To improve the speed and efficiency of the process, step 310 pre-processes the cropped point cloud 65 by breaking it up into a plurality of partitions corresponding to different parts of the animal. The partitioning step is itself a complex and nontrivial process, so FIG. 8 illustrates one embodiment of such a partitioning method. The virtual animal model 40 is likewise partitioned, or, more preferably, provided in a pre-partitioned format. Partitioning the cropped point cloud 65 and virtual animal model 40 enables the system 10 or 11 to selectively underweight or overweight different partitions when fitting the cropped point cloud 65 and virtual animal model 40 together.

Because measurements of hip height are commonly used in the ranching industry, in step 315 the automated module 300 estimates the hip height of the animal 15 represented by the cropped point cloud 65. The prior partitioning step 310 aids in this process, for in one embodiment the hip height is estimated by subtracting the minimum height of all the rear points in a rear legs partition from the maximum height of all the points in the rear torso partition.

In step 320, the automated module 300 "registers" the cropped point cloud 65 with the virtual animal model 40. In this step, the cropped point cloud 65 and/or virtual animal model 40 are translated, rotated, and scaled independently along each axis to approximately fit each other. The registration step 320 is also a complex and nontrivial process, so FIG. 7 illustrates one embodiment of a registration method.

Finally, in step 325, the system 10 or 11 performs a weighted comparison of the scaled virtual animal model 40 with the original virtual animal model 40. Step 325 produces a set of transformation parameters that relate a pre-transformed version of the virtual animal model 40 with a post-transformed version of the virtual animal model 40.

Figure 7:
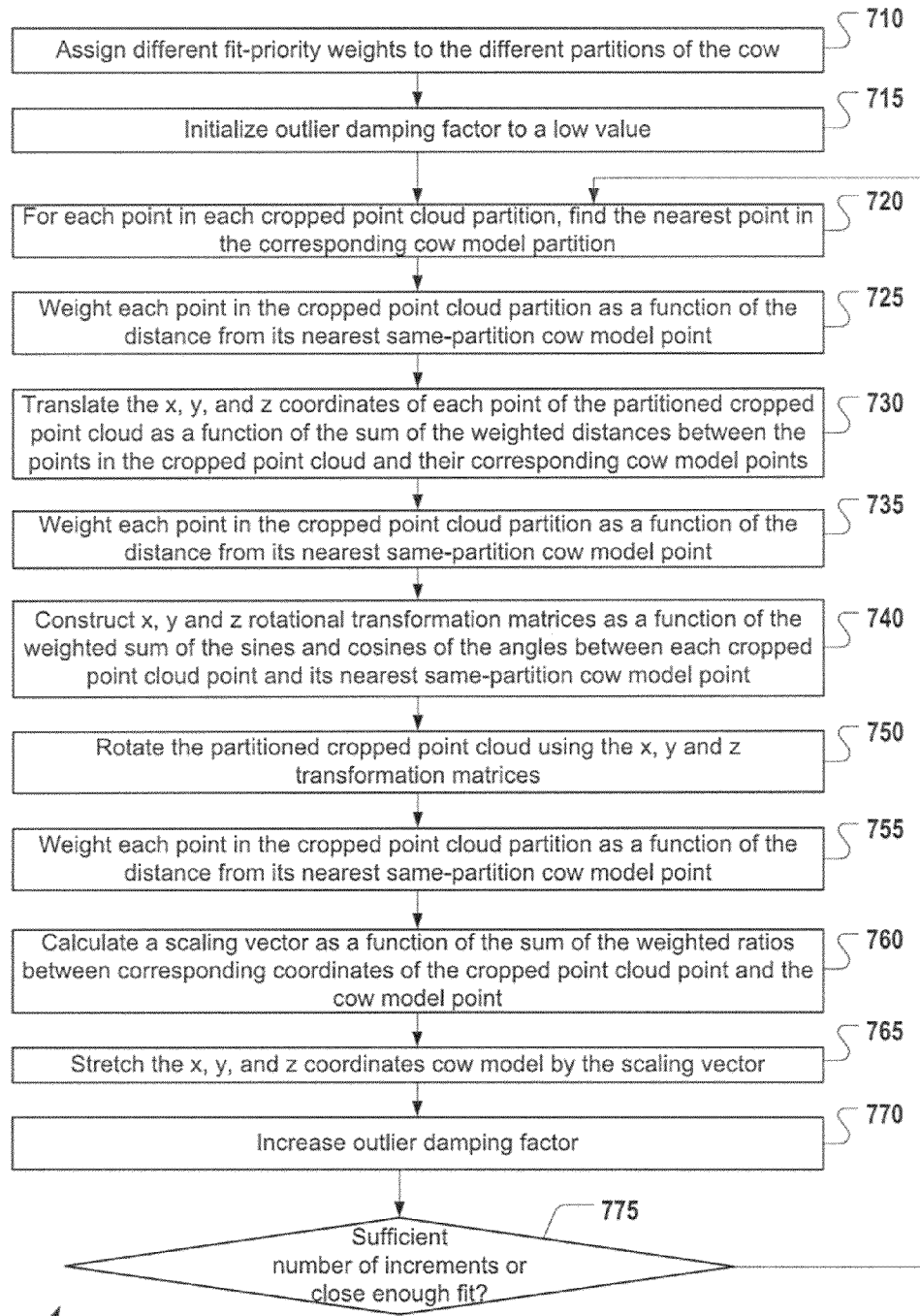
FIG. 7 is a functional flow diagram of one embodiment of an automated module and method for rotating and translating a cropped point cloud image relative to a virtual animal model and for scaling the virtual animal model to fit the reoriented cropped point cloud image.

FIG. 7 is a functional flow diagram of one embodiment of an automated point cloud registration module and method 700. FIG. 7 implements a matched filter to transform the cropped point cloud 65 and virtual animal model 40 to fit each other. In step 710, different relative weights are assigned to different partitions of the cow. For example, the torso of a cow is preferably weighted relatively more than the head, dewlap, or sheath of the cow. Also, experimentation suggests that it is advantageous to give the middle of the torso a relatively greater weight than the front and rear torso sections.

In step 715, the registration module 700 initializes a "damping factor" r that is used in a weighting formula (FIG. 9) to weight each point in the cropped point cloud 65. As explained further below in connection with FIG. 9, the registration module 700 uses a weighting formula that assigns a weight to each point in the cropped point cloud 65 that is a function of the spatial distance between that point and a matching virtual model point.

In steps 720-785, the module 700 enters into an iterative loop in which the point cloud and virtual model are iteratively transformed into an increasingly optimal fit.

In step 720, each point in each partition of the cropped point cloud 65 is matched with the nearest point in the corresponding partition of the virtual animal model 40. The registration module 700 creates an array B of "nearest neighbor" points of the same size and dimension as an array A that represents the cropped point cloud 65 points. For every point in array A, the registration module 700 computes the Euclidian distance between that point and every point in the corresponding partition of the virtual animal model 40. The registration module 700 assigns the X, Y, and Z coordinates of the closest virtual animal model 40 point to the corresponding point in array B.

In step 725, each point in each partition of the cropped point cloud 65 is weighted as a function of the spatial distance between that point and a matching virtual model point. An n×1 array of weight values $w_i$, where i=1 to n, is generated for each point i in array A. FIG. 9 illustrates a method of determining the weight values $w_i$. The weight $w_i$ of each point is a function 104 of the corresponding partition weight $w_p$, the square of the distance between the point and its matching virtual model point, and a "damping factor" r. The greater the spatial distance between a point in the cropped point cloud and its matching virtual model point, the less its resulting weight. Consequently, function 104 exponentially dampens out spurious points that are far from their nearest virtual model point. The function 104 illustrated in FIG. 9 can be characterized as a non-parametric localized non-linear cost function.

In step 730, the registration module 700 translates the cropped point cloud 65 to better fit the virtual animal model 40. The registration module 700 computes the normalized sum of the weighted distance, along the corresponding coordinate axis, between each array A point and its corresponding array B point. Then it translates the x, y and z coordinates of each point of the cropped point cloud 65 by the negative of this normalized sum.

FIG. 10 illustrates a method of matrix multiplication used to compute the sum of the weighted distance between the array A and array B points. An array 101, of the same size and dimension as array A, is created to represent the distance (dx, dy, dz) between each point in array A and its corresponding point in Array B. Array 101 is transposed and multiplied by the n×1 array 102 of weight values $w_1$ through $w_n$ generated using the formula set forth in FIG. 9. The product of this matrix multiplication is a 3×1 array 103 of translation values $t_x$, $t_y$, and $t_z$.

In step 735, the registration module 700 repeats step 725, once again weighting each point of the cropped point cloud 65 (which has just been translated in previous step 730) as a function of the re-calculated spatial distance between that point and its matching virtual model point.

In step 740, the registration module 700 independently constructs three rotational transformation matrices $R_x$, $R_y$, and $R_z$ to rotate the cropped point cloud 65 about each of its 3 axes. The registration module 700 computes values for these matrices by computing the normalized sum of the weighted cosines and the normalized sum of the weighted sines of the angles, along a plane orthogonal to the axis of rotation, between each cropped point cloud 65 point and its nearest same-partition virtual animal model 40 point.

FIG. 11 illustrates a 3×3 rotational transformation matrix $R_z$ for rotating the point cloud 65 about the z-axis. The (1, 1) and (2, 2) entries of the matrix correspond to the cosine of angle about which the point cloud 65 will be rotated. The (2, 1) and (1, 2) entries of the matrix correspond to the positive and negative of the sine of that same angle. Consistent with the principle that cosine of an angle between two vectors is a function of the dot product of the two vectors, the (1, 1) and (2, 2) entries of the matrix are computed as a function of the weighted sum of the dot product of the x and y coordinates of an array A point and its matching array B point. Consistent with the principle that the sine of an angle between two vectors is a function of the cross product between them, the (2, 1) and (1, 2) entries of the matrix are computed as a function of the weighted sum of the cross product of the x and y coordinates of an array A point and its matching array B point. The weight values w illustrated in FIG. 11 and used in these computations are the weight values calculated in step 735.

Similar logic, consistent with linear transformation principles, are used to construct transformation matrices $R_x$ and $R_y$. After all the rotation matrices have been created, then in step 750, the registration module 700 carries out the matrix multiplication set forth in FIG. 12, multiplying the array A of point cloud points by each of the transformation matrices $R_x$, $R_y$, and $R_z$.

In step 755, the registration module 700 repeats step 725, once again (and for the third time in the same iteration) weighting each point of the cropped point cloud 65 (which has just been rotated in previous step 750) as a function of the re-calculated spatial distance between that point and its matching virtual model point.

In step 760, the registration module 700 calculates a scaling vector to stretch the virtual animal model 40 into a better fit with the cropped point cloud 65. FIG. 13a illustrates the transformation of the virtual animal model 40, represented by matrix V, as the matrix product of matrices V and S. FIG. 13b illustrates the 3×3 scaling matrix S. FIG. 13c illustrates a formula for calculating scaling value $s_x$. The scaling value for each axis x, y, and z is computed as a function of the sum of the weighted ratios between corresponding coordinates of the cropped point cloud 65 and the virtual animal model 40. The weight values used in this calculation are the weight values that had been determined in previous step 755.

In step 765, the registration module 700 stretches the virtual animal model 40 along each of its x, y, and z axes by the scaling values computed in step 760.

In step 770, the damping factor r used in the weighting formula 104 of FIG. 9 is increased. In step 775, the registration module either repeats the loop set forth in steps 720-770 again for a fixed number of iterations (e.g., 30 iterations), or conditionally repeats the loop depending on the goodness of the fit. Applicants have obtained good results using damping factors r that start at 0.2 and slowly rise, over 30 iterations, to 1.0.

It will be noted that in the embodiment of the registration module 700 depicted in FIG. 7, the point cloud 65 is translated and rotated and the virtual animal model 40 is scaled. In one alternative embodiment, all of the transformations, including the translation and rotation, are done exclusively to the virtual animal model 40. In another alternative embodiment, all of the transformations, including the scaling, are done exclusively to the point cloud 65. In yet another alternative embodiment, the transformations are reversed: the virtual animal model 40 is translated and rotated, and the point cloud 65 is scaled. Many different alternatives are possible. Ultimately, what matters is that translation, rotation, and scaling transformations are done to either the point cloud 65, the virtual animal model 40, or both, until they are oriented, aligned, and scaled to an optimal fit with each other.

After the registration module 700 completes fitting the point cloud 65 with the virtual animal model 40, the system 11 can estimate the volume, mass, and/or weight of the animal. This can be accomplished in a plurality of ways. In one embodiment, the system 11 tracks the cumulative amount by which the virtual animal model 40 was scaled over successive iterations to fit the point cloud 65. In a more preferred embodiment, the system 11 compares a pre-transformed version (before the first fitting iteration) of the virtual animal model 40 with a post-transformed version (after the last fitting iteration) of the virtual animal model 40. This can be accomplished by carrying out the algorithm set forth in step 765 and FIGS. 13a-13b, where the a and b coordinates represented in FIG. 13c represent pre- and post-transformed versions, respectively, of the virtual animal model 40.

In alternative embodiments in which the scaling transformation was applied to the point cloud 65 rather than the virtual animal model 40, the system 11 either tracks the cumulative amount by which the point cloud 65 was scaled to fit the virtual animal model 40, or compares pre- and post-transformed versions of the point cloud 65.

It will be observed that in the aforementioned embodiments, the system 11 either determines the amount by which to scale the point cloud 65 or virtual animal model 40, or the amount by which the point cloud 65 or virtual animal model 40 was scaled. Moreover, in each of the aforementioned embodiments, the point cloud 65 or virtual animal model 40 is scaled by independent amounts over each of the x, y, and z axes. The scaling amounts $s_x$, $s_y$, and $s_z$ (FIG. 13b) along each of the x, y, and z axes can each be characterized as an independent "shape transformation" variable. And as demonstrated with FIG. 7, the system 11 is particularly programmed with the capability of selecting values for the shape transformation variables to reshape the virtual model into an optimal fit with the representation of the individual animal. The process set forth in FIG. 7 can also be characterized as adjusting spatial position and orientation variables 41, which are distinguishable from the virtual model's configurable shape parameters 42, that represent a relative spatial position and orientation of the cropped point cloud 65.

Yet other embodiments include more than three shape transformation variables. For example, in one embodiment, different partitions of an animal are scaled by different amounts.

FIG. 8 illustrates a cattle industry partitioning module 800 for breaking a cropped point cloud 65 of a cow into the following eight partitions: the cow's head, front torso, middle torso, rear torso, front legs, rear legs, sheath, and dewlap. In step 805, the cropped point cloud 65 is roughly centered along the x-axis. In step 810, the cropped point cloud is rotated about the x-axis so that it is aligned with the x-axis. In step 815, the point cloud is segmented into multiple (e.g., 50) x-axis increments. In step 820, the partitioning module 800 finds the segments that contain the animal's legs. In step 825, the partitioning module 800 finds the gap between the legs to identify the belly.

In step 830, the partitioning module 800 computes the slope of the cow's lateral contour to find the front shoulder and rump. Alternatively, the partitioning module 800 computes the slope of the bottom points to find the rear and front parts of the belly. In step 835, the partitioning module 800 uses the identified front shoulder and rump points (or in the alternative, the front and rear belly points) as references to find the front legs, rear legs, rear part, middle part, and sheath of the animal. In step 840, the partitioning module 800 computes the slope of the bottom points just past the front legs to find the lower part of the chest. In step 845, the partitioning module 800 finds the top part of the neck. In step 850, the partitioning module uses the identified front shoulder (or in the alternative, the front belly), lower chest, and neck points as references to find the front part, head, and dewlap of the animal.

IV. Illustrations and Sample Test Results

Figure 15:
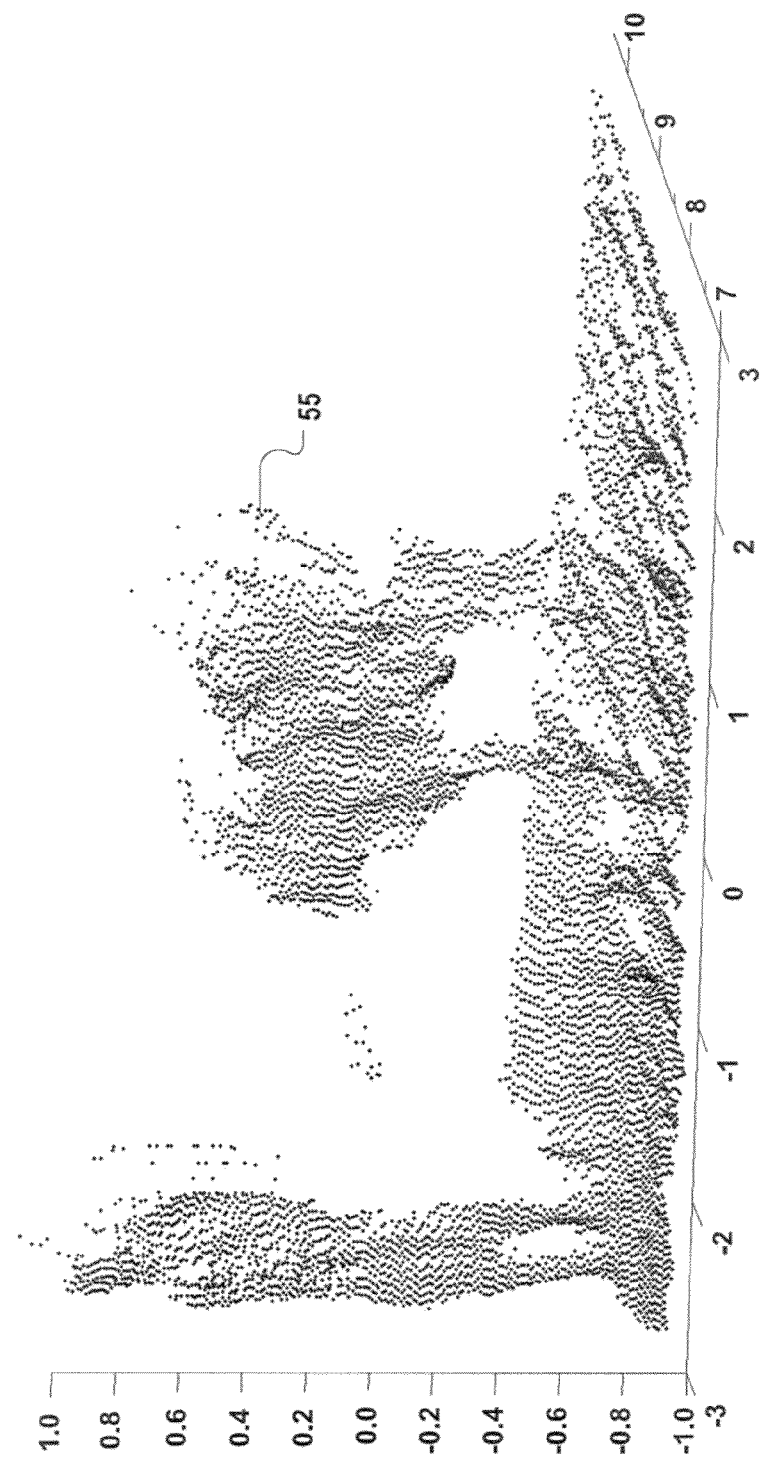
FIG. 15 illustrates the stereoscopic image of the livestock animal, a man standing next to the livestock animal, and the surrounding pasture.
Figure 16:
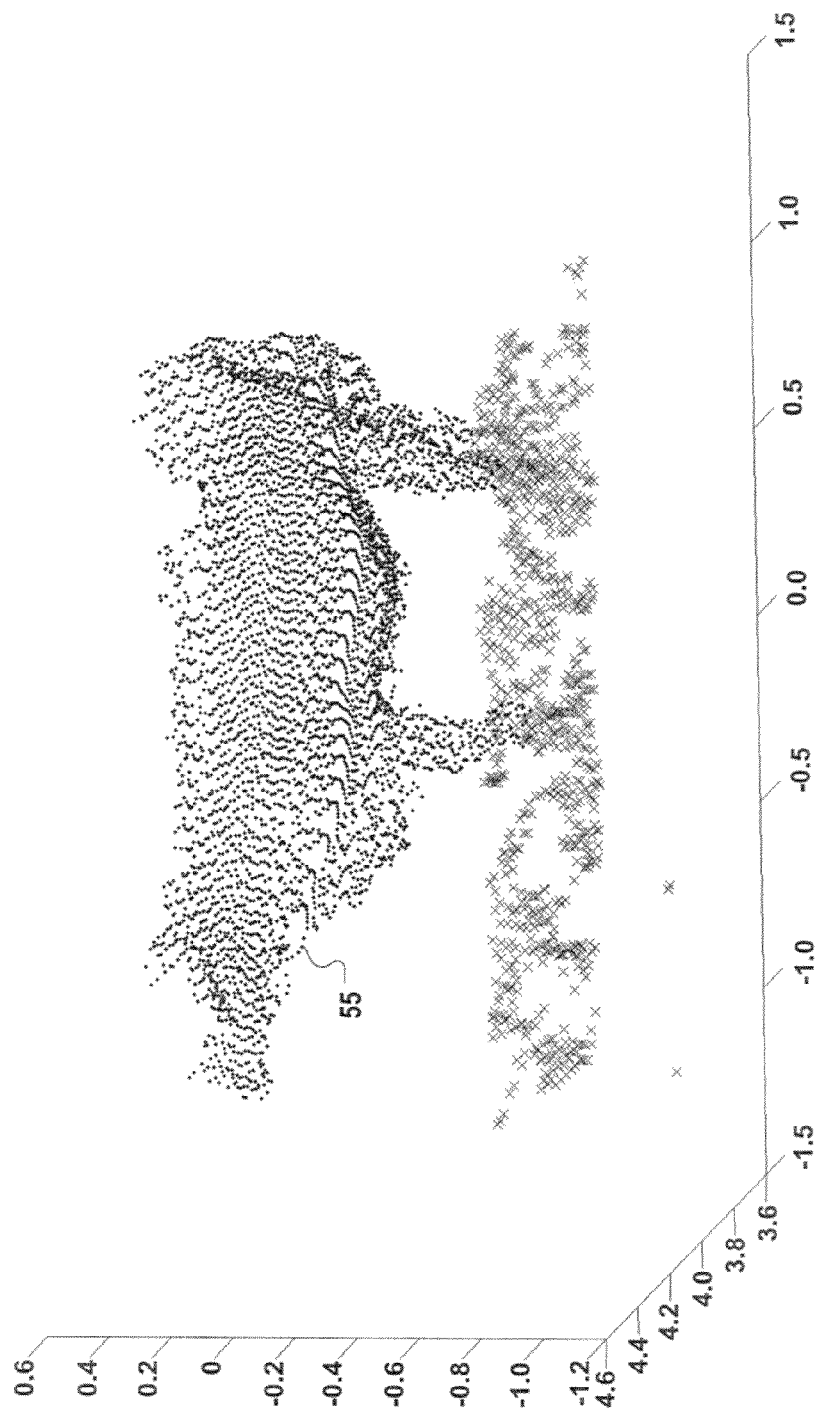
FIG. 16 illustrates the image of FIG. 15, after it has been partially cropped to remove the points representing the man.
Figure 18:
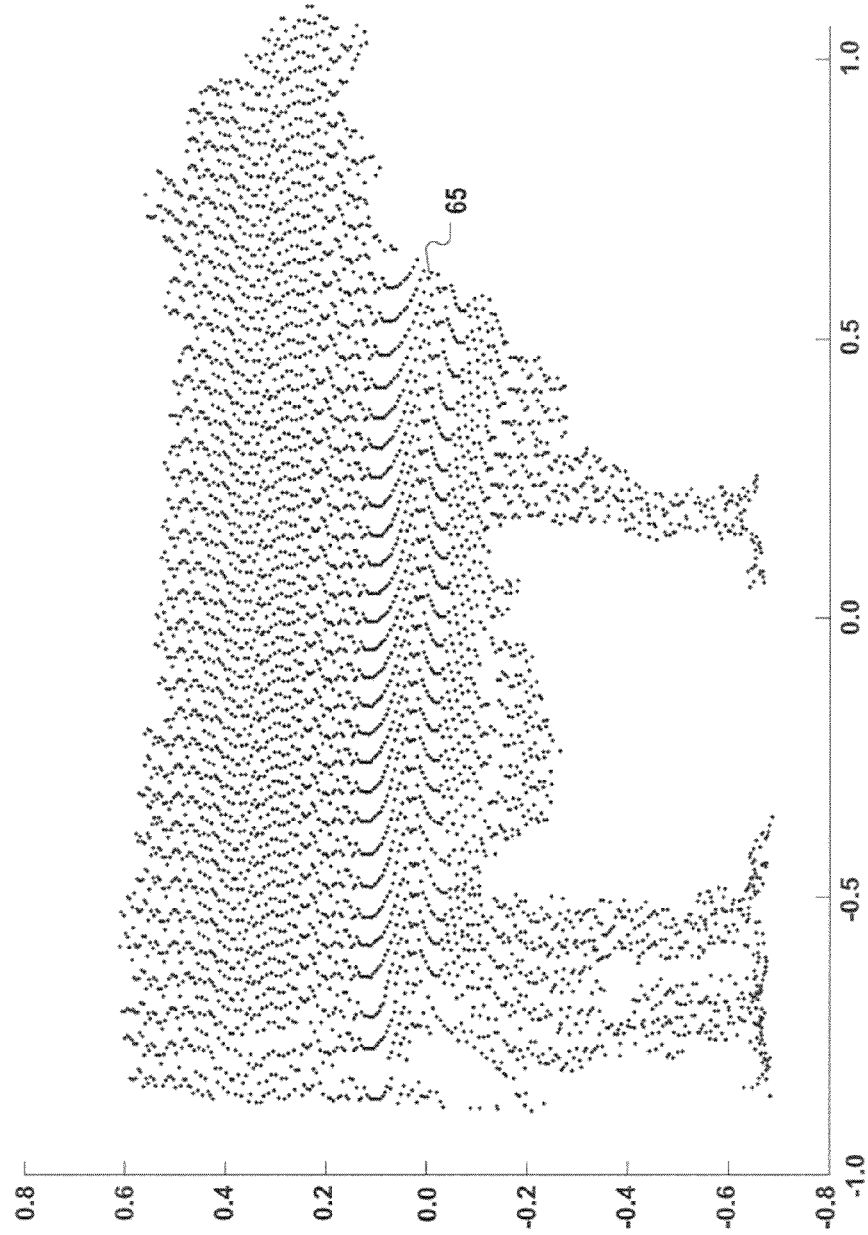
FIG. 18 illustrates a side view of the cropped point cloud of FIG. 17, after it has been translated to center the point cloud about the origin of the x-y axis.

FIGS. 15-22 illustrate the use of an embodiment of a remote contactless stereoscopic automated mass estimation system to estimate the volume, mass, and/or weight of a cow. FIG. 15 illustrates the stereoscopic point cloud generated by a stereoscopic image capture of the livestock animal, a man standing next to the livestock animal, and the surrounding pasture. FIG. 16 illustrates the image of FIG. 15, after it has been partially cropped, using the method of FIG. 4, to remove the points representing the man. FIG. 17 illustrates the image of FIG. 16, after it has been further cropped using the method of FIG. 5, to remove the ground points. FIG. 18 illustrates a side view of the cropped point cloud of FIG. 17, after it has been translated to center the point cloud about the origin of the x-y axis.

Figure 19:
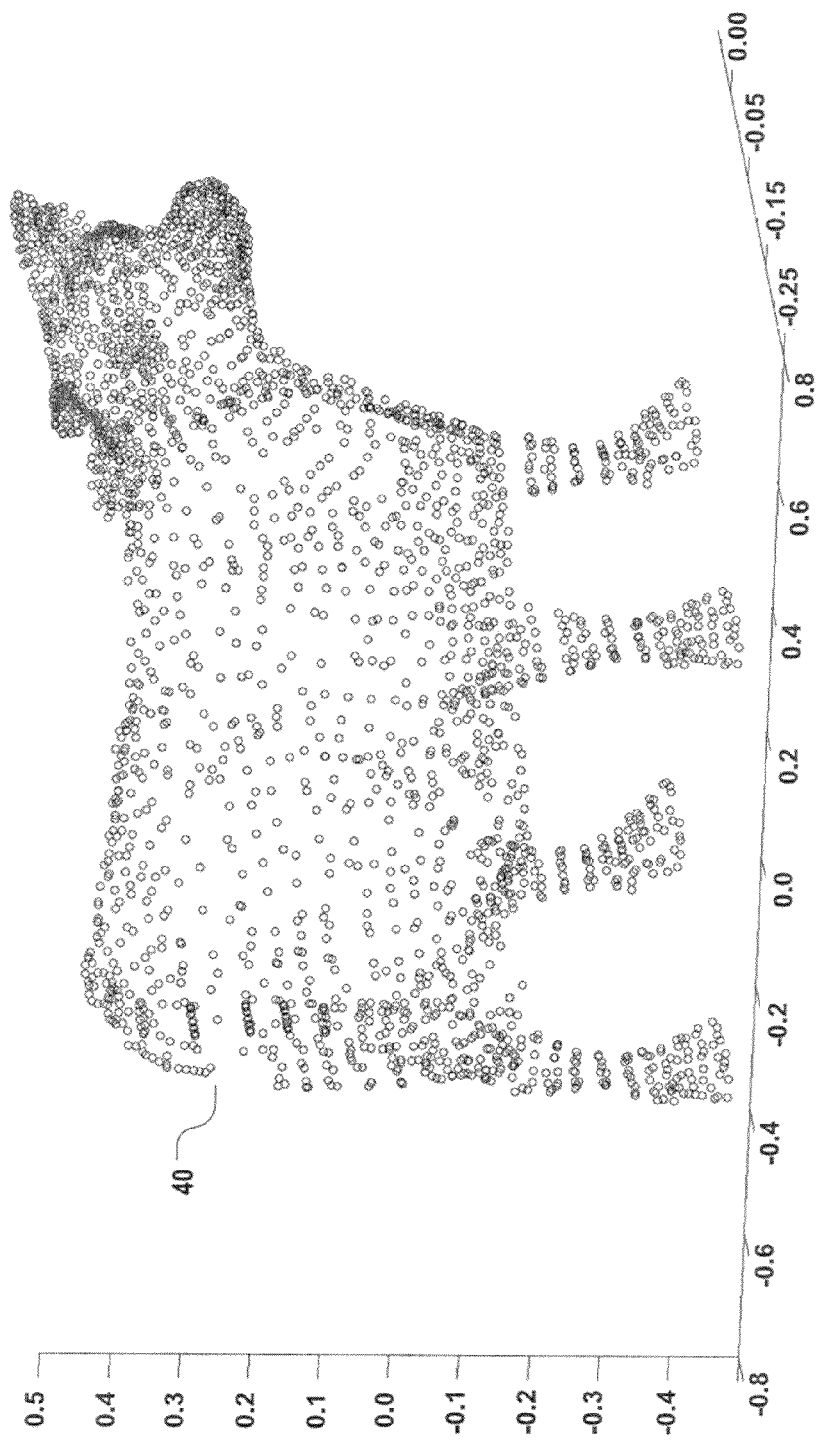
FIG. 19 illustrates a canonical three-dimensional virtual animal model operable to be rotated, translated, and reshaped using a set of independently configurable shape parameters.
Figure 20:
FIG. 20 is a side view of the canonical three-dimensional virtual animal model of FIG. 19.
Figure 21:
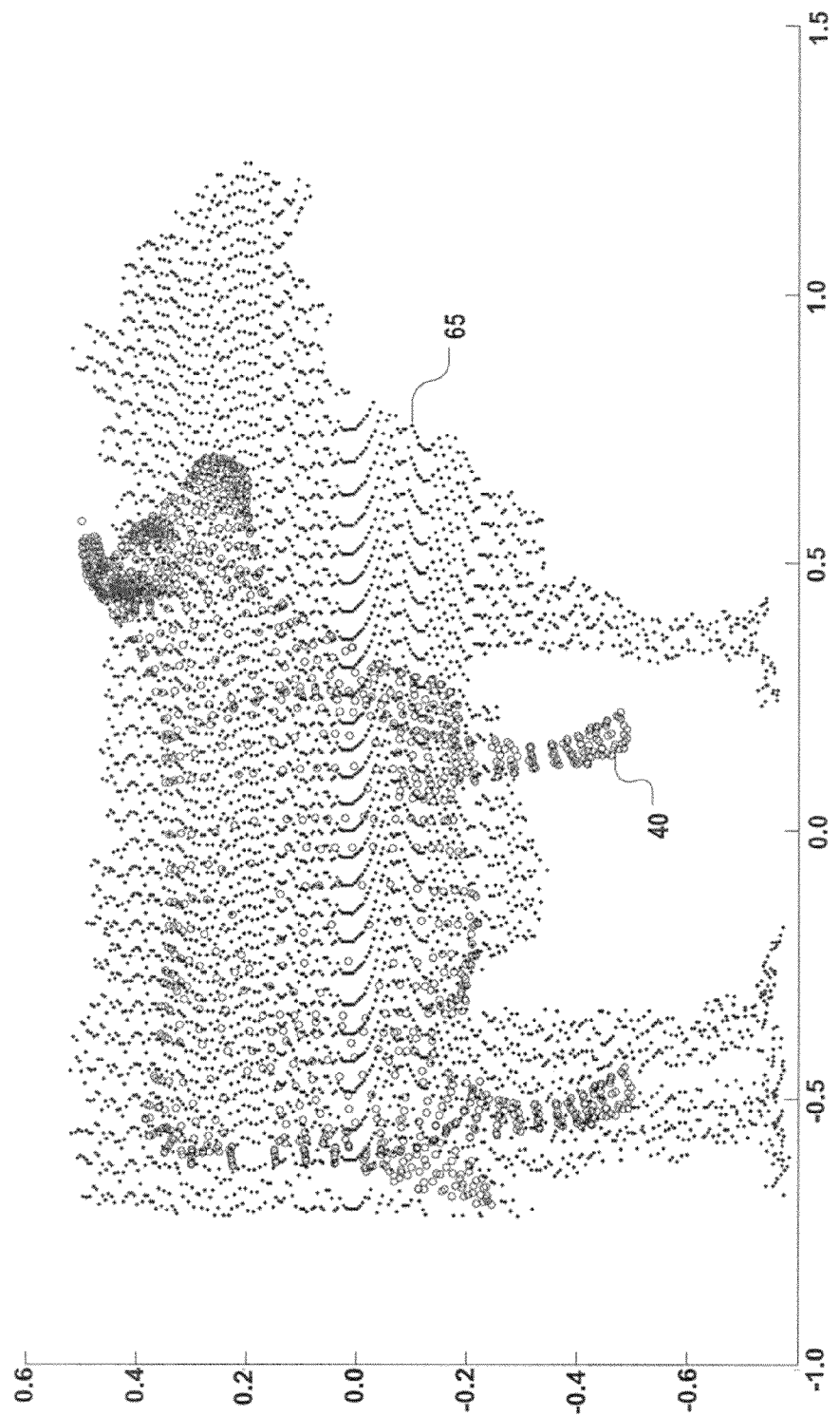
FIG. 21 illustrates the virtual animal model superpositioned with the point cloud prior to alignment.
Figure 22:
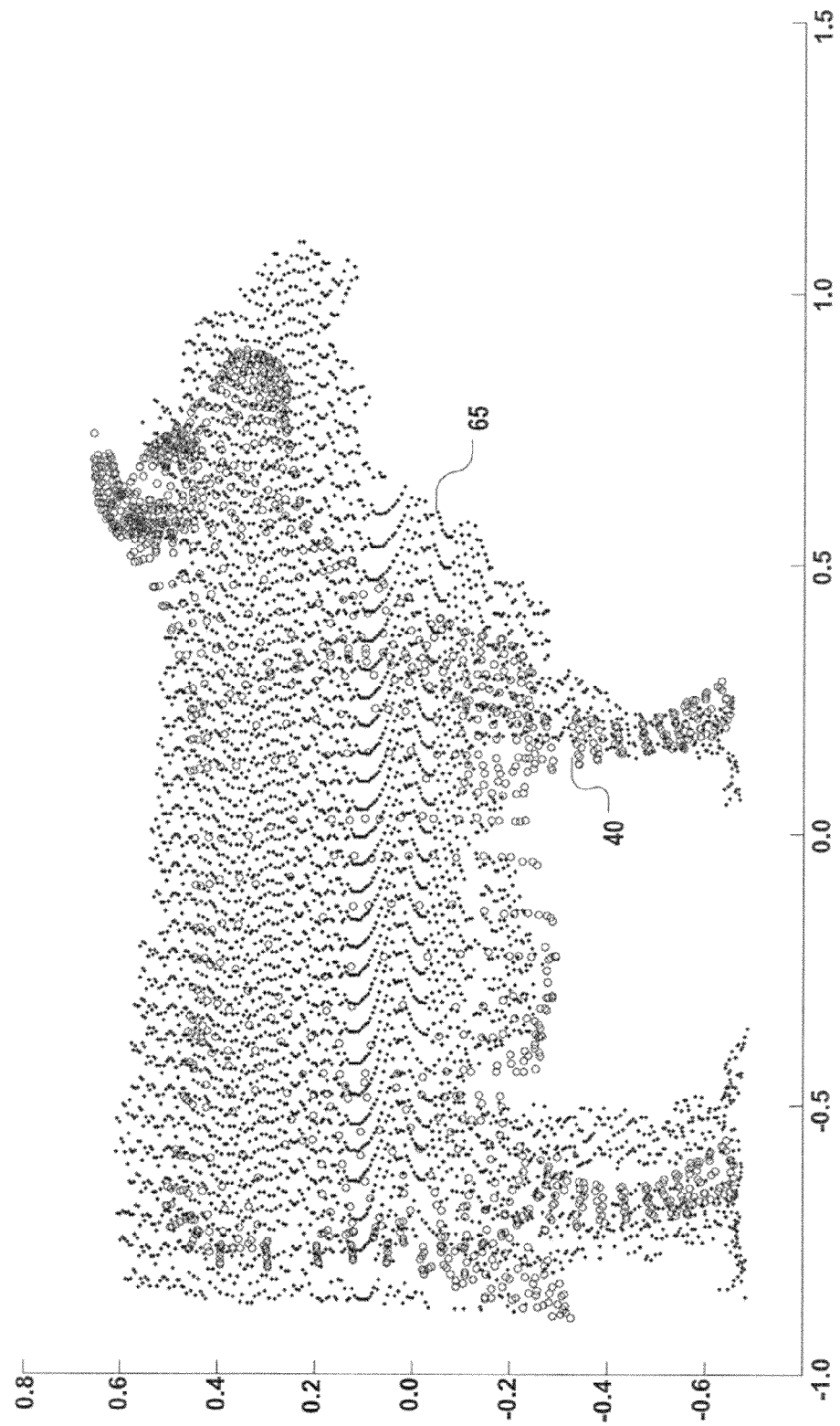
FIG. 22 illustrates the point cloud substantially aligned with and reshaped to approximately or optimally fit the virtual animal model.

FIGS. 19 and 20 illustrate a canonical three-dimensional virtual animal model 40 used to estimate the volume, mass and/or weight of the cow. FIG. 21 illustrates the virtual animal model 40 superpositioned with the point cloud 65 prior to alignment. FIG. 22 illustrates the point cloud 65 after it has been translated and aligned with the virtual animal model 40, which in turn has been scaled into an optimal fit with the point cloud 65. The parameters used to scale the virtual animal model 40 are then used to estimate the volume, mass, and/or weight of the cow captured in the stereoscopic image.

The following table discloses actual test results generated for three cows by the use of an actually-reduced-to-practice embodiment—marketed under the trademark ClicRWeight™ by ClicRWeight, LLC, of Tampa Fla.—of a remote contactless stereoscopic automated mass estimation system.

| Cow ID | Distance to Cow (m) | Measured Scale Weight (kgs) | ClicRWeight ™ estimate (kgs) |
|---|---|---|---|
| Red__7C | 4.62 | 300 | 309 |
| Red__7C | 8.55 | 300 | 315 |
| Brown__44 | 5.43 | 358 | 348 |
| Brown__44 | 4.87 | 358 | 376 |
| Brown__27 | 5.19 | 463 | 439 |
| Brown__27 | 4.83 | 463 | 468 |

Figure 23:
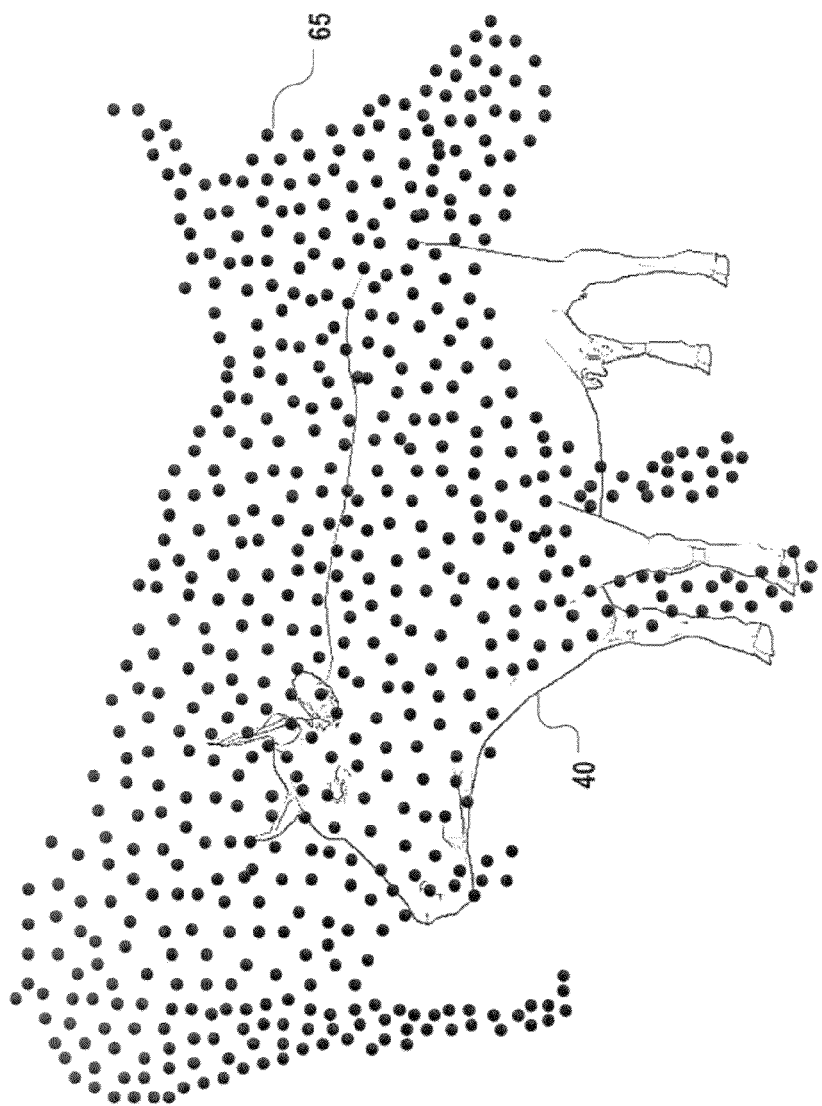
FIG. 23 illustrates another virtual animal model superpositioned with another point cloud prior to alignment.
Figure 24:
FIG. 24 illustrates a partial alignment of the virtual animal model of FIG. 23 with the point cloud.
Figure 25:
FIG. 25 illustrates the virtual animal model substantially aligned with, but not yet reshaped to approximately fit, the point cloud.
Figure 26:
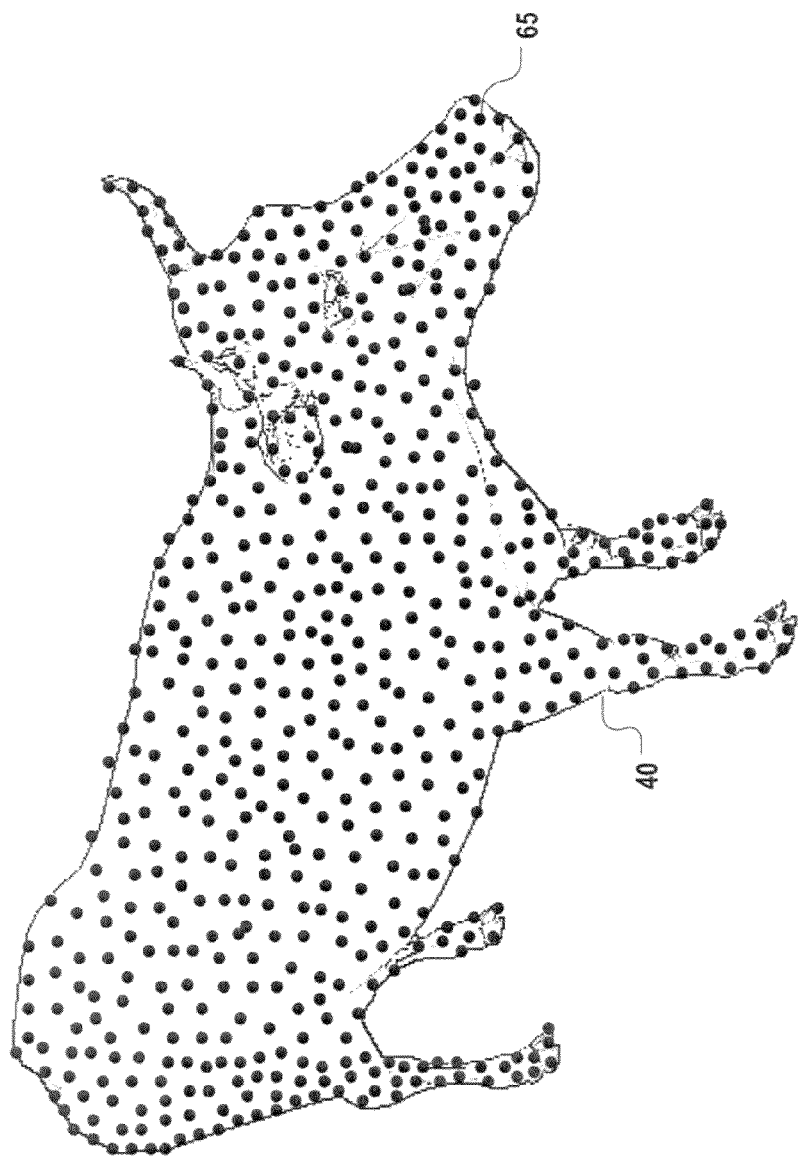
FIG. 26 illustrates the virtual animal model substantially aligned with and reshaped to approximately fit the point cloud, in order to estimate the volume, mass and/or weight of the cow.

FIGS. 23-26 illustrate an alternative embodiment in which a virtual model 40 is translated and rotated to fit a cropped point cloud 65 (which in this embodiment is not rotated or scaled) representing a stereoscopically photographed animal. FIG. 23 illustrates the virtual animal model 40 superpositioned with the point cloud 65 prior to alignment. FIG. 24 illustrates the virtual animal model 40 partially but less than fully rotated to approximately fit the point cloud 65. FIG. 25 illustrates the virtual animal model 40 substantially aligned with, but not yet reshaped to approximately fit, the point cloud 65. FIG. 26 illustrates the virtual animal model 40 substantially aligned with and reshaped to approximately fit the point cloud 65.

FIGS. 27-29 illustrate an embodiment of a remote contactless stereoscopic automated mass estimation system to estimate the volume, mass and/or weight of a person. FIG. 27 illustrates a canonical three-dimensional virtual model 71 of a person. FIG. 28 is a perspective view of a cropped stereoscopic point cloud image of a real person 72, captured using a stereoscopic camera. FIG. 29 illustrates the cropped stereoscopic point cloud image of the real person 72 fitted to the virtual model 71 to estimate the volume, mass, and/or weight of the person 72.

The present invention also covers the use of arbitrary virtual models to estimate the volume, mass, and/or weight of an animal. Indeed, the ClicRWeight™ camera, which uses a canonical virtual model of a cow, has been demonstrated—surprisingly—to estimate the mass or weight of a horse and other animals, including even humans to a reasonable degree of accuracy. FIGS. 30-37 illustrate this extended scope of the present invention.

Figure 30:
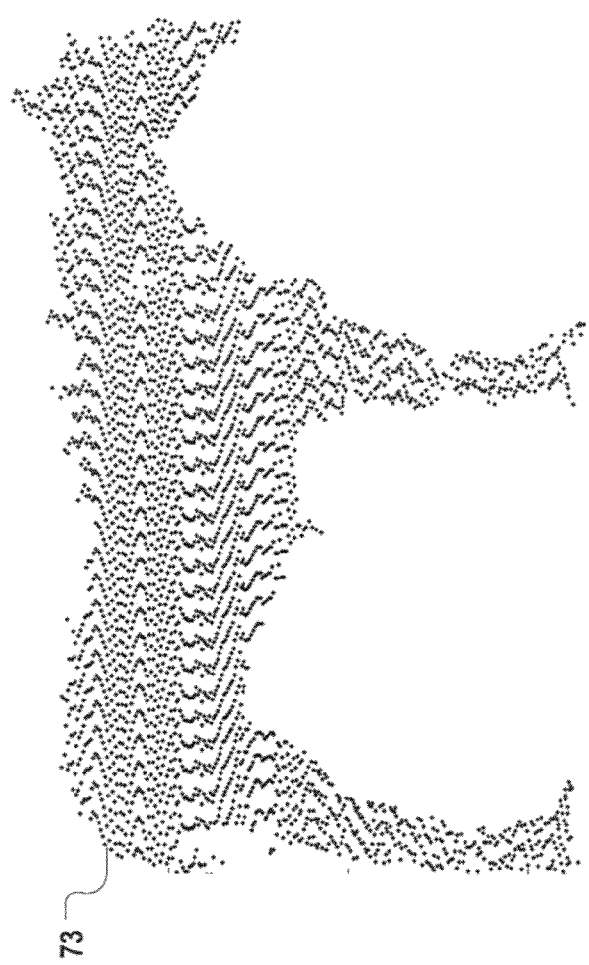
FIG. 30 illustrates a cropped stereoscopic point cloud image of a horse.
Figure 31:
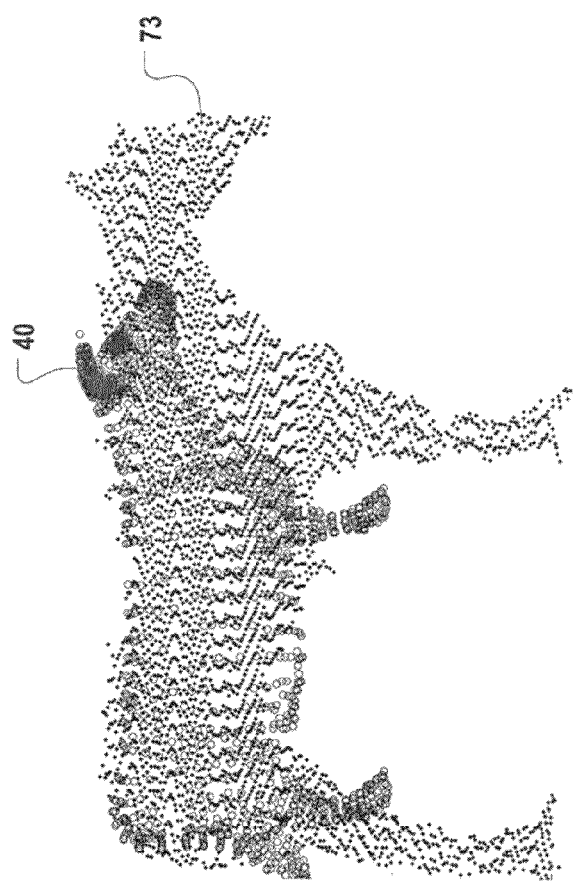
FIG. 31 illustrates the cropped point cloud image of a horse from FIG. 30 superimposed on a virtual model of a cow.
Figure 32:
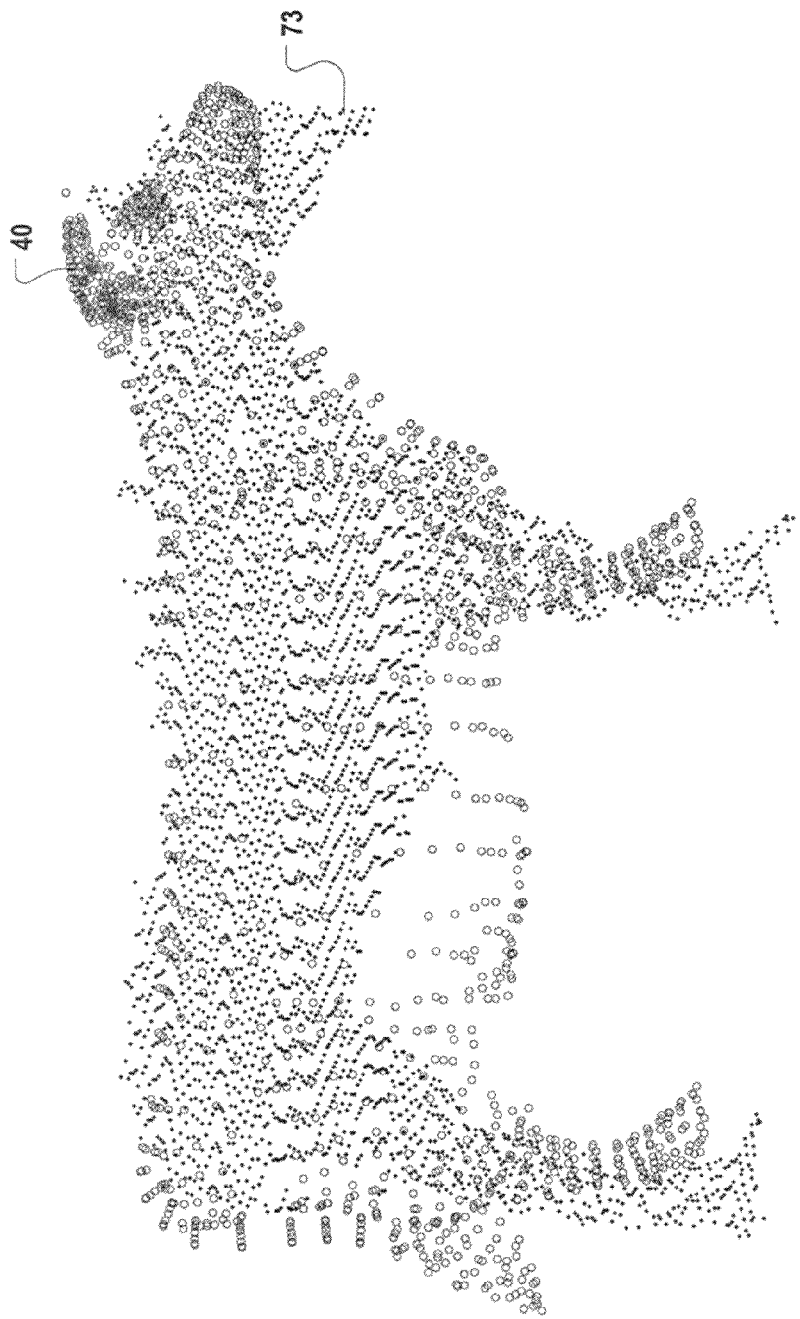
FIG. 32 illustrates the cropped point cloud image of a horse after it has been scaled, re-oriented, and reshaped to approximately fit the cow model.

FIGS. 30-32 illustrate the use of a canonical virtual model 40 of a cow to estimate the volume, mass and/or weight of a horse. FIG. 30 illustrates a cropped stereoscopic point cloud image 73 of a horse. FIG. 31 illustrates the cropped point cloud image 73 superimposed on the virtual model 40 of a cow. FIG. 32 illustrates the cropped point cloud image 73 of the horse and the virtual model 40 after they have been scaled, re-oriented, and reshaped to approximately fit each other.

Figure 33:
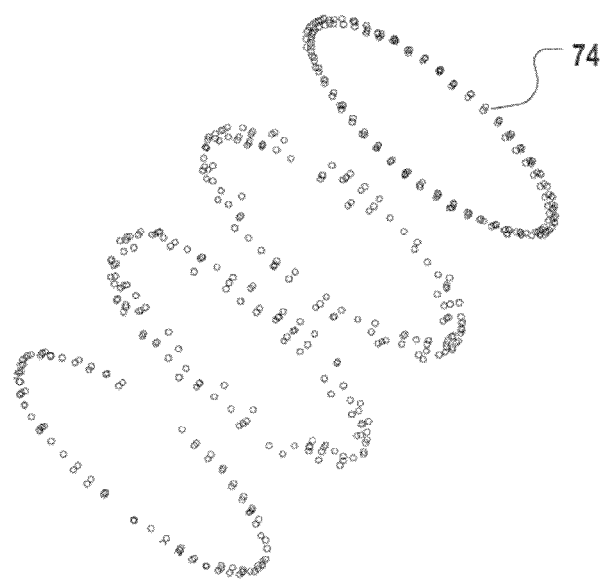
FIG. 33 illustrates a three-dimensional model of the ribs of a barrel.
Figure 34:
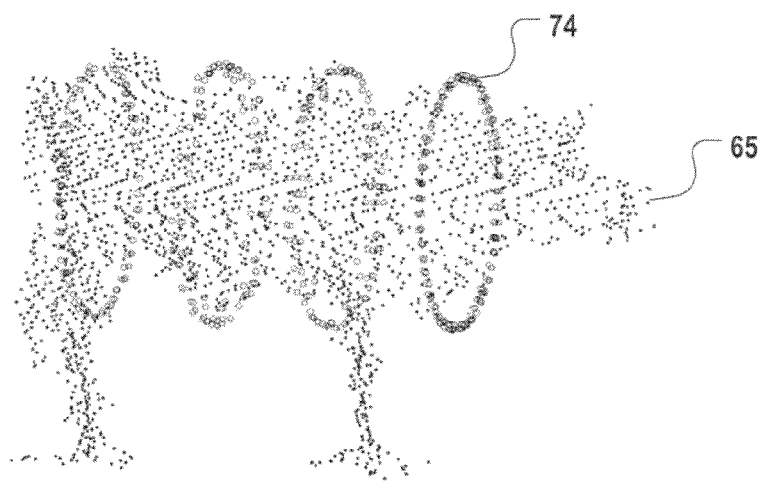
FIG. 34 illustrates a cropped point cloud image of a cow fit to the model of FIG. 33, in order to estimate the volume, mass and/or weight of the cow.

FIGS. 33-34 illustrate the use of a virtual model 74 of the ribs of a barrel to estimate the volume, mass, and/or weight of a cow. FIG. 33 illustrates a three-dimensional virtual model 74 of four spaced apart rings. FIG. 34 illustrates a cropped point cloud image 65 of a cow fit to the model 74 of FIG. 33, in order to estimate the volume, mass and/or weight of the cow 65. These figures illustrate how an arbitrary three-dimensional shape can be used as a virtual model that is stretched to estimate the weight of a target animal. Other examples include, but are not limited to, ellipsoids and rectangular prisms.

Figure 35:
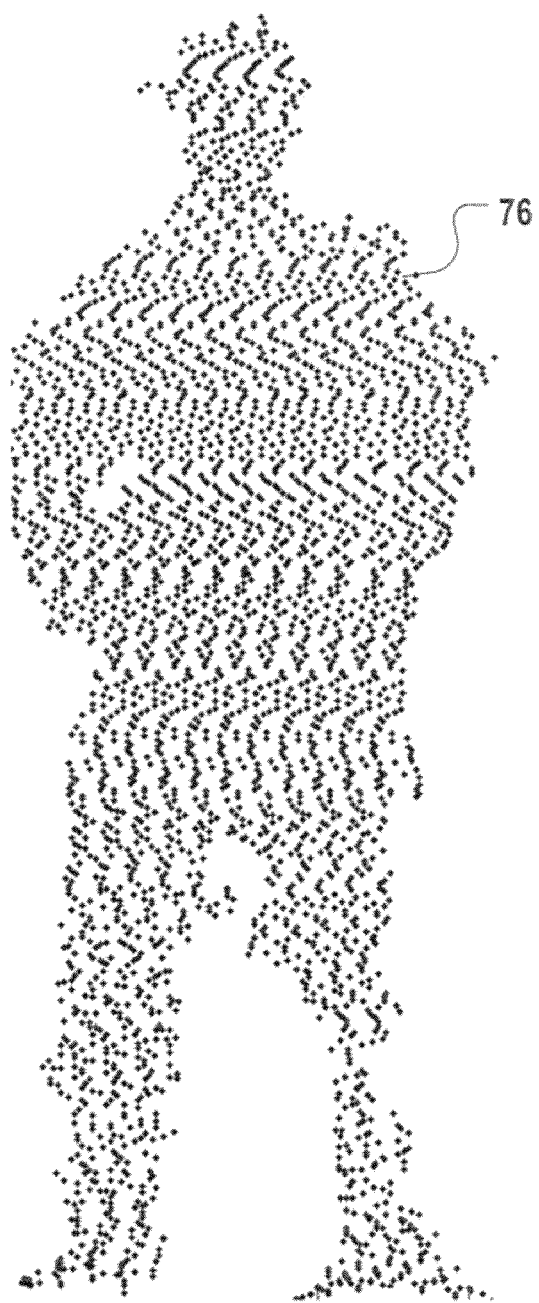
FIG. 35 illustrates a cropped point cloud image of a human person.
Figure 36:
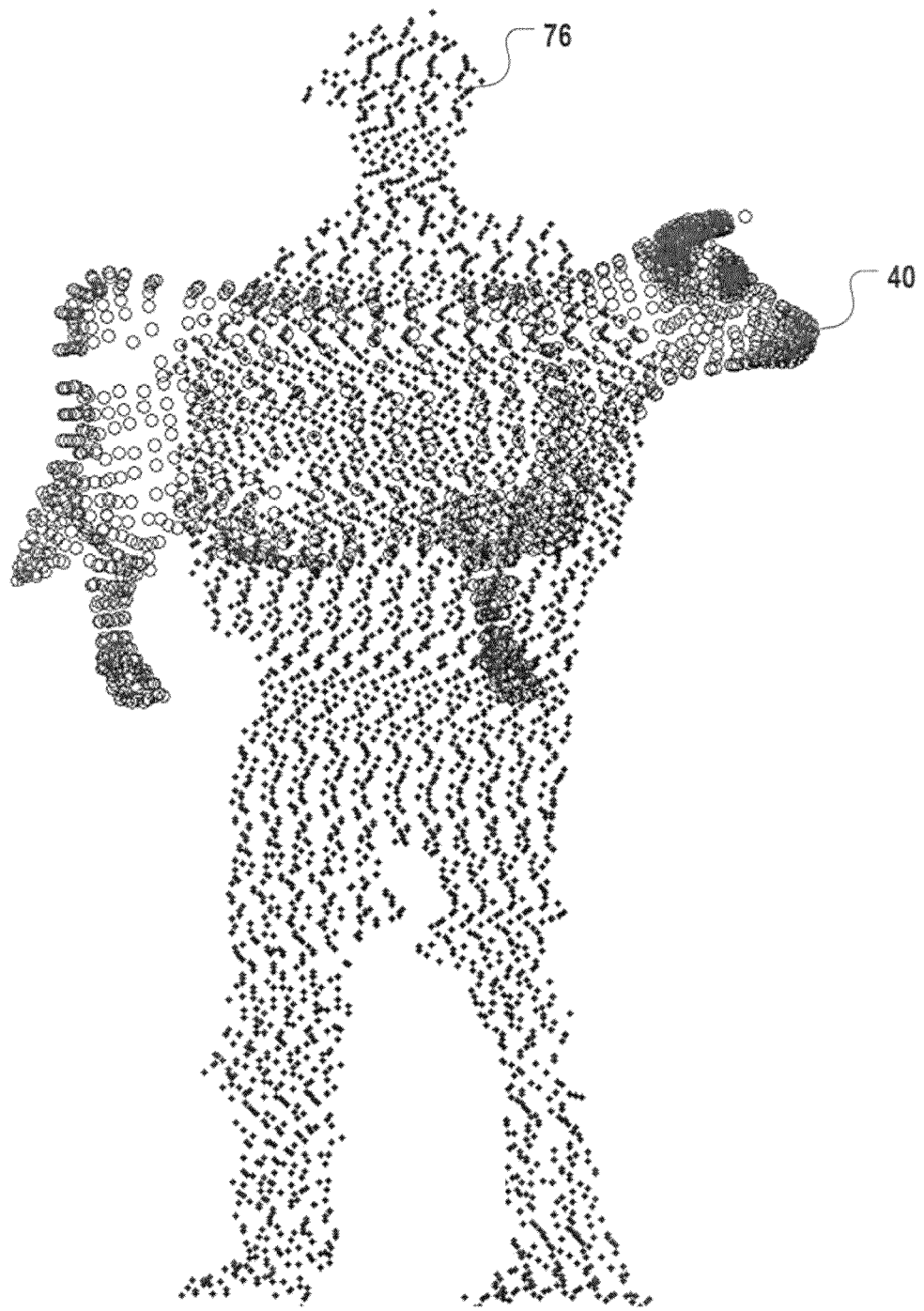
FIG. 36 illustrates the cropped point cloud of a human person superimposed on a virtual model of a cow.
Figure 37:
FIG. 37 illustrates the virtual model of a cow after it has been resized and reshaped to approximately fit the cropped point cloud of the human person.

FIGS. 35-37 illustrate—in surprising fashion—the use of a canonical virtual model 40 of a cow to estimate the volume, mass and/or weight of a real human person. FIG. 35 illustrates a cropped point cloud image 76 of a real human person. FIG. 36 illustrates the cropped point cloud 76 of a human person superimposed on the virtual model 40 of a cow. FIG. 37 illustrates the virtual model 40 of a cow after it has been resized and reshaped to approximately fit the cropped point cloud 76 of the human person.

One of the many benefits of the present invention is the relatively simple structural setup needed to weigh an animal, compared to other image-based volume, mass, and weight estimation systems. Whereas many prior art designs require contact with or highly restrictive confinement of livestock, in order to guide them into a suitable position with respect to an array of cameras, the present invention is suitable for mobile and easily redeployable implementations.

FIGS. 33 and 34 illustrate the front and back, respectively, of a portable, structurally integrated system 12 for remotely estimating the weight of an animal. The system 12 includes two stereo camera imagers 91 and a single-point laser-range finder 92 on the front of the body 90. The system 12 further comprises a user input interface 93 and output screen 94 on the back of the body 90. The system 12 may also include a standard optical viewfinder (not shown).

A computer 30 (not shown), capable of performing stereo image processing, segmentation, and virtual-model-fitting fitting functions, and the weight-estimating function as well, is integrated into the body of the device.

The user input interface 93 drives a menu that enables a user to select an animal type or class (and associated virtual animal model), and to adjust various camera and laser range finder settings. The user input interface 93 also includes an LCD screen 93 that is operable, as a digital viewfinder, to display an image produced by the system 12. The screen 93 is also operable to display text relaying both the predicted weight and an error parameter related to the accuracy of the fit between the reshaped virtual model and the cropped point cloud.

The system 12 includes a handle 95 to enable a user to hold the system 12. Preferably, the system 12 is small enough to fit entirely within a 12-inch-diameter sphere, and is light enough that it weighs less than 15 pounds.

FIG. 35 illustrates a side view of a second embodiment of a portable, structurally integrated system 13 for remotely estimating the volume, mass and/or weight of an animal. System 13 comprises a triclops (i.e., three imagers) stereo camera 96 physically connected, via a pivotable bracket 97, to a computer case or holder 98 holding a general purpose tablet computer 99 with a touch screen interface that enables one to draw, sketch and write directly on the screen. An example of such a stereo camera 25 is Point Grey's™ Bumblebee® XB3 camera. The camera 96 is communicatively coupled to the computer 99, which is loaded with software capable of performing the image processing functions described herein.

Figure 38:
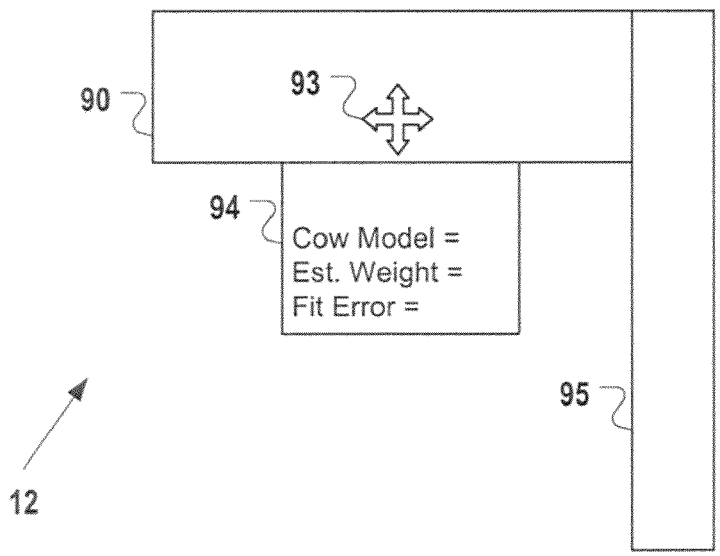
FIGS. 38 and 39 illustrate the front and back, respectively, of one embodiment of a portable, structurally integrated system for remotely estimating the volume, mass and/or weight of an animal.
Figure 39:
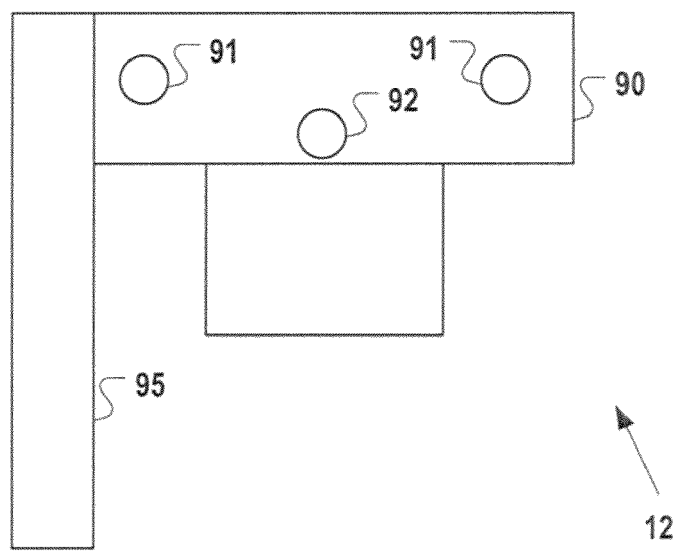
Figure 40:
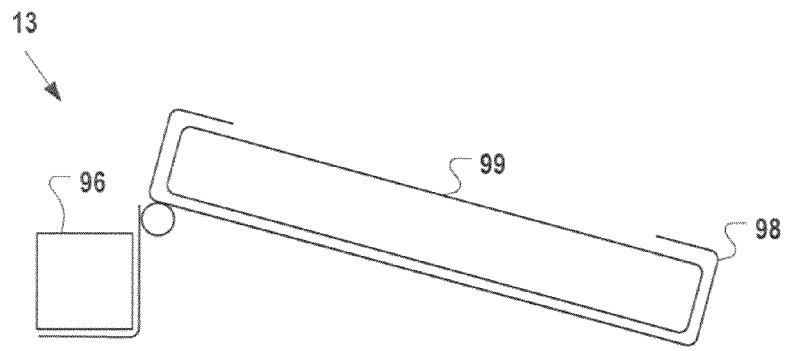
FIG. 40 illustrates a side view of a second embodiment of a portable, structurally integrated system for remotely estimating the volume, mass and/or weight of an animal.
Figure 41:
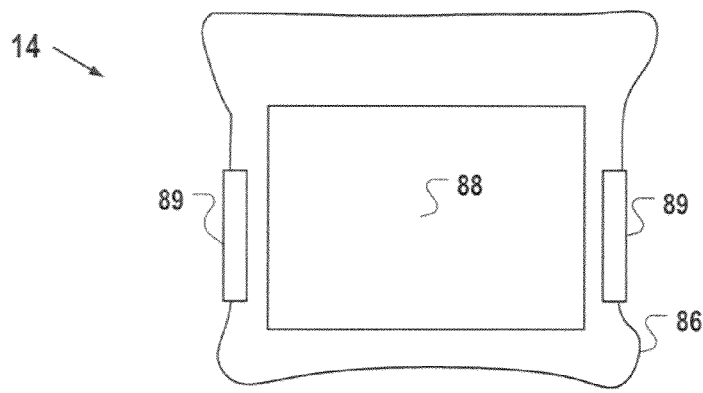
FIGS. 41-43 illustrate top, front, and side views, respectively, of a third embodiment of a portable, structurally integrated system for remotely estimating the volume, mass and/or weight of an animal.
Figure 42:
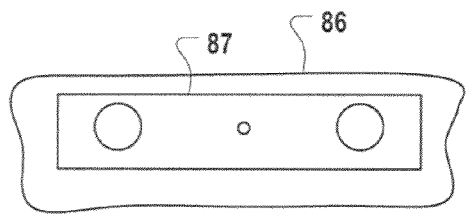
Figure 43:
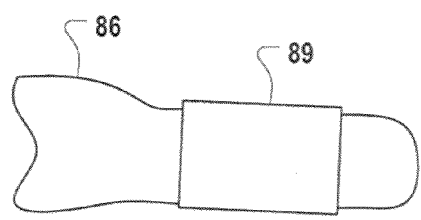

FIGS. 36-38 illustrate top, front, and side views, respectively, of a third embodiment of a portable, structurally integrated system 14 for remotely estimating the volume, mass and/or weight of an animal. System 14 comprises a case 86 that encloses both a stereo camera 87 and a tablet computer having a touch-screen interface 88. Gripping members 89 on the sides of the system 14 facilitate portable handling, for example while on horseback, of the system 14.

Figure 14:
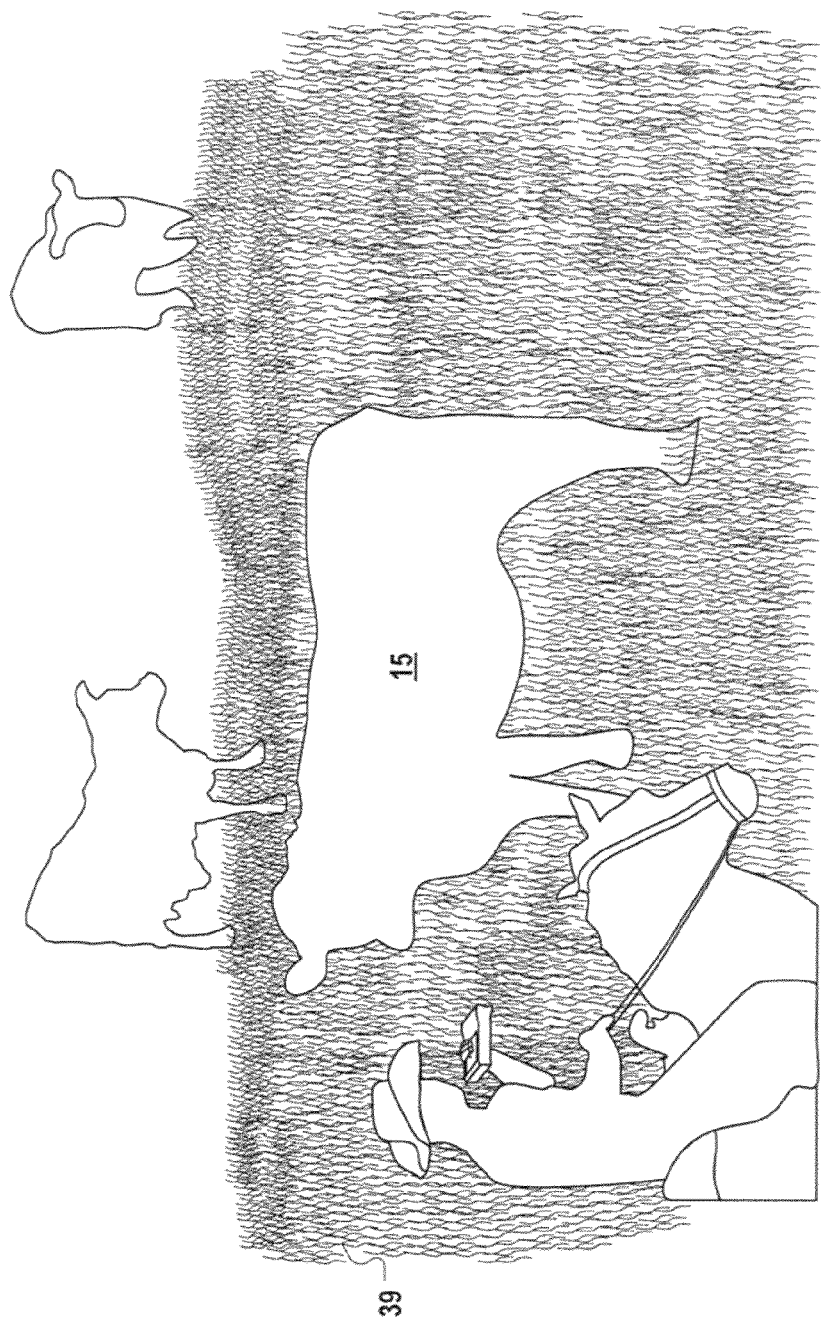
FIG. 14 illustrates a cowboy on horseback carrying a stereo camera to capture a stereo image of a livestock animal grazing on a pasture.

FIG. 14 illustrates a cowboy on horseback carrying a system 12 to capture a stereo image of a target animal 15 (a cow) in a scene 39.

The invention may be applied not only to cattle, livestock animals, and mammals (including humans) generally, but also to other living organisms. Preferably, the virtual animal model 40 is of a characteristic animal of a class of animals (e.g., the same species; the same species and breed; the same species, breed, and gender; the same species, breed, gender and approximate age) to which the target animal 15 belongs.

Different sets of configurable shape parameters are also contemplated. In one embodiment for a three-dimensional virtual model, exactly three independently configurable shape parameters would be provided to linearly stretch or contract the virtual model along each of the model's primary axes. In another embodiment, different shape parameters would be provided to adjust the height of only the leg portion of the virtual model versus the overall height of the virtual model.

More accurate estimates might be obtained by employing a family of virtual animal models. For example, different animal models might be employed for different volume, mass or weight categories (e.g., a different model for every 200-300 pounds) and for different postures (e.g., the animal's head raised or the animal's head lowered to the ground for grazing). In two embodiments, the computer 30 would be particularly programmed to either automatically pre-select one of a plurality of animal models predicted to provide the best fit, or perform an optimal fit of each of a plurality of animal models to the point cloud 65. In the latter embodiment, the computer 30 could either derive an estimated volume, mass, or weight based on two or more of the plurality of approximately fit animal models, or calculate the estimated volume, mass, or weight based on a single animal model that was determined to provide the most accurate fit to the point cloud 65.

In another embodiment, a laser is used to scan an animal and acquire a three-dimensional depth map. The depth map is compared to a canonical shape volume for the animal under consideration. The distortion of the local depth map to the canonical shape volume is used to estimate the volume of the animal. A thermal image is used to estimate the fat-to-muscle ratio of the animal. The fat to muscle ratio is used as an estimate of the density of the animal. The two factors, density and volume, are then combined to predict the mass of the animal.

In yet other embodiments, (1) the software includes a learn mode to automatically develop the coefficients; (2) the animal model is rotated 180 degrees and a best fit is attempted in that opposite orientation, and the weight estimate derived from the 180 degree orientation as well; (3) automatic gain control is used for lighting; (4) automatic exposure settings are utilized; and (5) IR filters are used on the stereocamera.

It will be understood that the particular configurations of many of the embodiments and their elements could be changed without departing from the spirit of the present invention. It will also be understood that although the invention is illustrated and was tested in reference to cattle, the invention is generally applicable to other livestock animals, ungulates, mammals, and non-mammalian animals and living organisms. It will also be understood that to the extent this application uses the term "cow," it is meant as a singular, non-gender- and non-age-specific equivalent of the plural term "cattle." Other colloquial references to a "singular cattle" include "a head of cattle," "an ox," "a bovine," "a beast," "a cattle beast," and "a critter." The invention is believed to be as useful for bulls, steers, calves, and heifers as it is for mature female cattle.

The present invention is also applicable to humans. Thus, when this application uses the term "animal" or "mammal," those terms are intended to cover humans unless specifically excluded.

Also, although some of the embodiments of the invention utilize a canonical or idealized virtual model of an animal, the invention would also cover treating and using a point cloud of an imaged, and not necessarily idealized, animal as a virtual model.

Having thus described exemplary embodiments of the present invention, it should be noted that the disclosures contained in FIGS. 1-43 are exemplary only, and that various other alternatives, adaptations, and modifications may be made within the scope of the present invention. Accordingly, the present invention is not limited to the specific embodiments illustrated herein, but is limited only by the following claims.

We claim:

1. A system for estimating the volume, mass or weight of an individual animal comprising:
   a representation of an individual animal, generated from an image-capturing machine and comprising a plurality of spatially distributed points, stored on a computer readable medium;
   a virtual spatial model of a reference object comprising a plurality of spatially distributed points; and a computer particularly programmed with the capability of reshaping the virtual spatial model, the representation of the individual animal, or both, into an approximate fit with each other and with the capability of matching individual points in the representation of the individual animal with individual points in the virtual spatial model; and
   a camera for capturing the representation of a visible or spatial characteristic of the individual animal, such that the camera and the computer are included in a hand-held unit,
   wherein the computer is particularly programmed to estimate the mass, weight, or volume of the individual animal as a function of an amount that the virtual spatial model, the representation of the individual animal, or both, were reshaped.

2. The system of claim 1, further characterized in that the computer is particularly programmed with the automatic capability of reshaping the virtual spatial model, the representation of the individual animal, or both, into an approximate fit with each other.

3. The system of claim 1, further characterized in that the computer is particularly programmed with the automatic capability of rotating the representation of the individual animal, the virtual spatial model, or both, so that the representation of the individual animal and the virtual spatial model have substantially similar orientations.

4. The system of claim 1, further characterized in that the computer is particularly programmed with the capability of automatically cropping a portion of an original image that surrounds a representation of the individual animal in order to generate the representation of the individual animal.

5. The system of claim 1, further characterized in that the computer is particularly programmed with the capability of automatically partitioning both the representation of an individual animal and the virtual spatial model in order to facilitate the reshaping of the virtual spatial model, the representation of the individual animal, or both, into an approximate fit with each other.

6. The system of any of claim 1, further characterized in that the virtual spatial model is a multi-dimensional profile of a reference animal.

7. The system of claim 6, further characterized in that the virtual spatial model is a cow model.

8. The system of any of claim 7, wherein the individual animal is a mammal.

9. The system of claim 8, wherein the mammal is a livestock animal.

10. A system for estimating the volume, mass or weight of an individual animal comprising:
a representation of a visible or spatial characteristic of the individual animal stored on a computer readable medium;
a spatially multi-dimensional virtual model that is shape-configurable through a set of at least two independent shape transformation variables, stored on a computer readable medium, of an object; and
a computer particularly programmed with the capability of
transforming the virtual model, the representation of the individual animal, or both, into an optimal fit with each other, using at least two independent transformation parameters;
selecting values for the shape transformation variables to reshape the virtual model into an optimal fit with the representation of the individual animal;
estimating the volume, mass or weight of the individual animal as a function of the selected values for the shape transformation variables used to reshape the virtual model; and
estimating the mass or weight of the individual animal as a function of a plurality of independent relational parameters that relate pre- and post-transformed versions of the virtual model or the representation of the individual animal.

11. The system of claim 10, wherein the computer is particularly programmed with the capability of automatically identifying suitable values for variables of a volume-estimating, mass-estimating, or weight-estimating function, wherein the variables of the function are the same as or derived from the transformation parameters used to approximately fit the representation of the individual animal and the virtual model with each other.

12. The system of claim 10, wherein the computer is particularly programmed with the capability of automatically identifying suitable values for variables of a volume-estimating, mass-estimating, or weight-estimating function, wherein the variables of the function are the same as or derived from the relational parameters that relate the pre- and post-transformed versions of the representation of the individual animal or the virtual model.

13. The system of claim 10, further characterized in that:
the virtual model is shape-configurable through a set of at least two independent shape transformation variables;
the computer is particularly programmed with the capability of selecting values for the shape transformation variables to reshape the virtual model into an optimal fit with the representation of the individual animal;
the computer is particularly programmed with the capability, after the virtual model has been reshaped into an optimal fit with the representation of the individual animal, of determining a set of relational parameters that relate a pre-transformed version of the virtual model with a post-transformed version of the virtual model; and
the computer is particularly programmed with the capability of estimating the volume, mass or weight of the individual animal as a function of the relational parameters.

14. The system of claim 10, wherein the computer is particularly programmed with the capability of aligning the representation of the animal with the virtual model so that the representation of the animal and the virtual model have substantially similar orientations.

15. The system of claim 14, wherein the computer is particularly programmed with the capability of rotating and translating the virtual model to match the orientation of the representation of the animal.

16. The system of claim 14, wherein the computer is particularly programmed with the capability of rotating and translating the representation of the animal to match the orientation of the virtual model.

17. The system of claim 10, wherein the computer is particularly programmed with the capability of at least one of the set consisting of:
automatically rotating and translating the virtual model into an orientation that approximately matches an orientation of the representation of the individual animal; and
automatically rotating and translating the representation of the individual animal into an orientation that approximately matches an orientation of the virtual model.

18. The system of claim 17, wherein the computer is particularly programmed to transform the virtual model to approximately fit the representation of the individual animal using at least two independently determined shape transformation variables.

19. The system of claim 10, further comprising a camera, communicatively coupled to the computer, that generates a representation of a visible or spatial characteristic of the individual animal.

20. The system of claim 10, further comprising a stereo camera, communicatively coupled to the computer, that generates a representation of a visible or spatial characteristic of the individual animal.

21. The system of claim 20, wherein the stereo camera is operable to capture a stereoscopic image of the individual animal and the computer is particularly programmed to transform the stereoscopic image into a three-dimensional representation of the animal, wherein the representation of a visible or spatial characteristic of the individual animal consists of said three-dimensional representation.

22. The method of claim 20, further comprising automatically registering the point cloud with the virtual model.

23. The method of claim 22, further comprising transforming the point cloud and virtual model to fit each other using a matched filter routine.

24. The method of claim 22, further comprising cropping the point cloud and then matching each point in the cropped point cloud with a corresponding point in the virtual model.

25. The method of claim 24, further comprising matching each point in the cropped point cloud with a nearest point of the virtual model.

26. The method of claim 25, further comprising portioning both the cropped point cloud and the virtual model into a plurality of partitions corresponding to different parts of the animal.

27. The method of claim 26, wherein one of the partitions corresponds substantially only to one of the following parts of a cow:
the head;
the front legs;
the rear legs;
the dewlap; and
the sheath.

28. The method of claim 26, wherein each matched point to a point in a partition of the cropped point cloud is the nearest point in a corresponding partition of the virtual model.

29. The system of claim 26, further comprising assigning partition-specific weights to points in different partitions of the cropped point cloud, and transforming the cropped point cloud and virtual model to fit each other by an amount that is a function of the partition-specific weights.

30. The method of claim 25, further comprising assigning a weight to each point in the cropped point cloud that is a function of the spatial distance between that point and its matching virtual model point.

31. The system of claim 10, wherein the animal is a human.

32. The system of claim 10, wherein the representation comprises a stereo image representation of the animal.

33. The system of claim 10, wherein the representation comprises a three-dimensional representation of the animal.

34. The system of claim 10, wherein the representation comprises a projection of the animal on a plane.

35. The system of claim 34, wherein the representation includes depth data corresponding to an estimated distance from the plane to each point of the animal being projected onto the plane.

36. The method of claim 34, further comprising automatically removing points in the cropped point cloud linked to the blob origin point cloud through removed ground points.

37. The system of claim 10, further comprising a machine that captures a representation of a scene including the individual animal, and wherein the computer automatically crops a portion of the scene surrounding the individual animal.

38. The system of claim 37, wherein the machine is programmed to automatically distinguish the animal from the surrounding scene.

39. The system of claim 10, wherein the representation comprises a non-color-specific three-dimensional profile of the animal.

40. The system of claim 10, further comprising a machine that captures and stores the representation in the form of a point cloud having spatial coordinates.

41. The system of claim 10, wherein the representation of a visible or spatial characteristic of the individual animal comprises a point cloud having spatial coordinates.

42. The system of claim 41, wherein the point cloud represents a projection of the individual animal on an image plane coupled with depth data, the depth data providing the estimated relative depth—from the perspective of the camera—of each point in the representation.

43. The system of claim 41, wherein the computer is programmed the capability of automatically isolating a group of spatially proximate points presumed to include the individual animal from the point cloud.

44. The system of claim 41, wherein the points at the center of the point cloud, hereinafter referred to as blob origin points, are presumed to represent a portion of the target animal; and
wherein the computer is programmed with the capability of automatically identifying points in the cloud that are spatially proximate to the blob origin points and all other points in the cloud that are connected to the blob origin points through intermediate spatially proximate points.

45. The system of claim 44, wherein the computer is programmed with a ground-removal routine capable of automatically cropping the point cloud to exclude points presumed to represent a ground surface on which the individual animal was standing.

46. The system of claim 45, wherein the computer is programmed with the capability of automatically isolating points in the point cloud presumed to represent a portion of the target animal's legs in furtherance of the ground-removal routine.

47. The system of claim 46, wherein the computer is programmed with the capability of automatically removing points in the cropped point cloud linked to the blob origin point cloud through removed ground points.

48. The system of claim 41, wherein the point cloud is cropped and then each point in the cropped point cloud is matched with a corresponding point in the virtual model.

49. The system of claim 48, wherein each point in the cropped point cloud is matched with a nearest point of the virtual model.

50. The system of claim 48, wherein each point in the cropped point cloud is assigned a weight that is a function of the spatial distance between that point and its matching virtual model point.

51. The system of claim 41, wherein the computer is programmed to iteratively transform the point cloud and virtual model into an increasingly optimal fit.

52. The system of claim 51, wherein during each iteration a point in the point cloud is matched with a nearest corresponding point in the virtual model.

53. The system of claim 52, wherein during each iteration the point cloud image is translated as a function of the weighted sum of the distances between each point in the point cloud and its nearest corresponding point in the virtual model.

54. The system of claim 53, wherein during each iteration the point cloud image is also rotated as a function of weight values assigned to each point in the point cloud.

55. The system of claim 54, wherein during each iteration the virtual model is also scaled to increasingly fit the point cloud.

56. A method for estimating the volume, mass or weight of an individual animal comprising:
machine generating a representation of a visible or spatial characteristic of the individual animal comprising a point cloud having spatial coordinates such that points at the center of the point cloud, hereinafter referred to as blob origin points, are presumed to represent a portion of the target animal;
automatically identifying points in the cloud that are spatially proximate to the blob origin points and all other points in the cloud that are connected to the blob origin points through intermediate spatially proximate points;

obtaining a virtual model, stored on a computer readable medium, of a spatially multidimensional object;

transforming, with the aid of a computer, the virtual model, the representation of the individual animal, or both, into an optimal fit with each other, using at least two independent transformation parameters; and estimating, with the aid of a computer, the volume, mass or weight of the individual animal as a function of a plurality of independent relational parameters that relate pre- and post-transformed versions of the virtual model or the representation of the individual animal.

57. The method of claim 56, wherein the virtual model is a multi-dimensional profile of a reference animal.

58. The method of claim 56, further comprising automatically identifying suitable values for variables of a volume-estimating, mass-estimating, or weight-estimating function, wherein the variables of the volume-estimating, mass-estimating, or weight-estimating function are the same as or derived from the transformation parameters used to approximately fit the representation of the individual animal and the virtual model with each other.

59. The method of claim 56, further comprising automatically identifying suitable values for variables of a volume-estimating, mass-estimating, or weight-estimating function, wherein the variables of the volume-estimating, mass-estimating, or weight-estimating function are the same as or derived from the relational parameters that relate the pre- and post-transformed versions of the representation of the individual animal or the virtual model.

60. The method of claim 56, further characterized in that the virtual model is shape-configurable through a set of at least two independent shape transformation variables, the method further comprising:

selecting values for the shape transformation variables to reshape the virtual model into an optimal fit with the representation of the individual animal; and estimating the volume, mass or weight of the individual animal as a function of the selected values for the shape transformation variables used to reshape the virtual model.

61. The method of claim 56, further characterized in that the virtual model is shape-configurable through a set of at least two independent shape transformation variables, the method further comprising:

selecting values for the shape transformation variables to reshape the virtual model into an optimal fit with the representation of the individual animal;

after the virtual model has been reshaped into an optimal fit with the representation of the individual animal, determining a set of relational parameters that relate a pre-transformed version of the virtual model with a post-transformed version of the virtual model; and estimating the volume, mass or weight of the individual animal as a function of the relational parameters.

62. The method of claim 56, further comprising aligning the representation of the animal with the virtual model so that the representation of the animal and the virtual model have substantially similar orientations.

63. The method of claim 62, further comprising rotating and translating the virtual model to match the orientation of the representation of the animal.

64. The method of claim 62, further comprising rotating and translating the representation of the animal to match the orientation of the virtual model.

65. The method of claim 62, wherein the representation includes depth data corresponding to an estimated distance from the plane to each point of the animal being projected onto the plane.

66. The method of claim 56, further comprising automatically rotating and translating the virtual model into an orientation that approximately matches an orientation of the representation of the individual animal.

67. The method of claim 56, further comprising automatically rotating and translating the representation of the individual animal into an orientation that approximately matches an orientation of the virtual model.

68. The method of claim 67, further comprising transforming the virtual model to approximately fit the representation of the individual animal using at least two independently determined shape transformation variables.

69. The method of claim 56, wherein the animal is a human.

70. The method of claim 56, wherein the representation comprises a stereo image representation of the animal.

71. The method of claim 56, wherein the representation comprises a three-dimensional representation of the animal.

72. The method of claim 56, wherein the representation comprises a projection of the animal on a plane.

73. The method of claim 56, further comprising:

capturing a representation of a scene including the individual animal; and automatically cropping a portion of the scene surrounding the individual animal.

74. The method of claim 73, further comprising automatically, and with the aid of a computer, distinguishing the animal from the surrounding scene.

75. The method of claim 56, wherein the representation comprises a non-color-specific three-dimensional profile of the animal.

76. The method of claim 75, further comprising automatically identifying a left-or-right orientation of the animal represented in the point cloud.

77. The method of claim 56, further comprising storing the representation in the form of a point cloud having spatial coordinates.

78. The method of claim 56, wherein the point cloud represents a projection of the individual animal on an image plane coupled with depth data, the depth data providing the estimated relative depth—from the perspective of the camera—of each point in the representation.

79. The method of claim 56, further comprising automatically isolating a group of spatially proximate points presumed to include the individual animal from the point cloud.

80. The method of claim 56, further comprising automatically cropping the point cloud to exclude points presumed to represent a ground surface on which the individual animal was standing.

81. The method of claim 80, further comprising automatically isolating points in the point cloud presumed to represent a portion of the target animal's legs in furtherance of the ground-removal routine.

82. The method of claim 56, wherein the virtual model comprises a computer-aided-design model of the reference animal.

83. The method of claim 56, wherein the virtual model comprises a set of spatially-determined points, each point having a spatial coordinate.

84. The method of claim 56, further comprising iteratively transforming the point cloud and virtual model into an increasingly optimal fit.

85. The method of claim 84, further comprising, during each iteration, matching a point in the point cloud with a nearest corresponding point in the virtual model.

86. The method of claim 85, wherein during each iteration, translating the point cloud image as a function of the weighted sum of the distances between each point in the point cloud and its nearest corresponding point in the virtual model.

87. The method of claim 86, wherein during each iteration, rotating the point cloud image as a function of weight values assigned to each point in the point cloud.

88. The method of claim 87, wherein during each iteration, scaling the virtual model to increasingly fit the point cloud.

89. A system for estimating the volume, mass or weight of an individual animal comprising:
- a machine that generates a representation of a visible or spatial characteristic of the individual animal;
- a computer communicatively coupled to the machine; and
- a spatially multi-dimensional virtual model, stored on a computer readable medium, of an object;
- wherein the computer is particularly programmed with the capability of transforming the virtual model, the representation of the individual animal, or both, into an optimal fit with each other, using at least two independent transformation parameters;
- wherein the computer is particularly programmed to estimate the mass or weight of the individual animal as a function of a plurality of independent relational parameters that relate pre- and post-transformed versions of the virtual model or the representation of the individual animal; and
- wherein the computer is particularly programmed with the capability of automatically identifying suitable values for variables of a volume-estimating, mass-estimating, or weight-estimating function, wherein the variables of the function are the same as or derived from the relational parameters that relate the pre- and post-transformed versions of the representation of the individual animal or the virtual model.

90. The system of claim 89, wherein the virtual model is a multi-dimensional profile of a reference animal.

91. The system of claim 89, wherein the computer is particularly programmed with the capability of automatically identifying suitable values for variables of a volume-estimating, mass-estimating, or weight-estimating function, wherein the variables of the function are the same as or derived from the transformation parameters used to approximately fit the representation of the individual animal and the virtual model with each other.

92. The system of claim 89, wherein the machine and computer are packaged within a mobile, portable, hand-held unit.

93. A system for estimating the volume, mass or weight of an individual animal comprising:
- a machine that generates a representation of a visible or spatial characteristic of the individual animal;
- a computer communicatively coupled to the machine; and
- a spatially multi-dimensional virtual model, stored on a computer readable medium, of an object such that the virtual model of the reference animal is shape-configurable through a set of at least two independent shape transformation variables;
- the computer is particularly programmed with the capability of selecting values for the shape transformation variables to reshape the virtual model into an optimal fit with the representation of the individual animal;
- the computer is particularly programmed to estimate the volume, mass or weight of the individual animal as a function of the selected values for the shape transformation variables used to reshape the virtual model
- the computer is particularly programmed with the capability of transforming the virtual model, the representation of the individual animal, or both, into an optimal fit with each other, using at least two independent transformation parameters; and
- the computer is particularly programmed to estimate the mass or weight of the individual animal as a function of a plurality of independent relational parameters that relate pre- and post-transformed versions of the virtual model or the representation of the individual animal.

* * * * *

UNITED STATES PATENT AND TRADEMARK OFFICE
CERTIFICATE OF CORRECTION

PATENT NO. : 8,351,656 B2
APPLICATION NO. : 12/770268
DATED : January 8, 2013
INVENTOR(S) : Spicola et al.

It is certified that error appears in the above-identified patent and that said Letters Patent is hereby corrected as shown below:

In the Claims:

Claim 56, Column 23, Line 2, "multidimensional" should read as --multi-dimensional--

Signed and Sealed this
Fourteenth Day of May, 2013

Teresa Stanek Rea
*Acting Director of the United States Patent and Trademark Office*